US012802371B2

(12) United States Patent
Kabuto et al.

(10) Patent No.: US 12,802,371 B2
(45) Date of Patent: Nov. 17, 2026

(54) INFORMATION PROCESSING DEVICE AND INFORMATION PROCESSING METHOD

(71) Applicant: Maxell, Ltd., Kyoto (JP)

(72) Inventors: Nobuaki Kabuto, Kyoto (JP); Yoshinori Okada, Kyoto (JP); Mayumi Nakade, Kyoto (JP); Hitoshi Akiyama, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 19/100,086

(22) PCT Filed: Aug. 10, 2022

(86) PCT No.: PCT/JP2022/030568
§ 371 (c)(1),
(2) Date: Jan. 30, 2025

(87) PCT Pub. No.: WO2024/034053
PCT Pub. Date: Feb. 15, 2024

(65) Prior Publication Data
US 2026/0038209 A1 Feb. 5, 2026

(51) Int. Cl.
*G06T 19/00* (2011.01)
*G02B 27/00* (2006.01)
*G02B 27/01* (2006.01)
*G06F 3/01* (2006.01)

(52) U.S. Cl.
CPC ........ *G06T 19/006* (2013.01); *G02B 27/0093* (2013.01); *G02B 27/0172* (2013.01); *G06F 3/012* (2013.01)

(58) Field of Classification Search
CPC ........... G06F 3/011–013; G06T 19/006; G02B 27/0093; G02B 27/0172
See application file for complete search history.

(56) References Cited

U.S. PATENT DOCUMENTS

2013/0326364 A1* 12/2013 Latta ....................... G06F 3/012 715/751
2020/0310561 A1* 10/2020 Connellan ........... G06F 3/03545
2020/0380733 A1 12/2020 Inatani
2022/0091663 A1* 3/2022 Hashimoto ............ G06F 3/012

FOREIGN PATENT DOCUMENTS

JP 2015-213226 A 11/2015
JP 2019-038413 A 3/2019
JP 2019-101743 A 6/2019
JP 2019-217790 A 12/2019
WO 2018/070193 A1 4/2018

OTHER PUBLICATIONS

International Search Report received in PCT Application No. PCT/JP2022/030568, dated Nov. 1, 2022.

* cited by examiner

*Primary Examiner* — Hang Lin
(74) *Attorney, Agent, or Firm* — Rimon P.C.

(57) ABSTRACT

An information processing device worn on a user, comprising: a display processing device configured to display an augmented reality object within a field of view display range; a walking detection sensor configured to detect a walking state of the user; and a processor, and the processor is configured to execute control of: determining whether the user is walking based on sensor information by the walking detection sensor, and upon determining that the user is walking, enlarging the augmented reality object; and displaying the augmented reality object as enlarged within the field of view display range.

13 Claims, 22 Drawing Sheets

INFORMATION PROCESSING DEVICE AND INFORMATION PROCESSING METHOD

CROSS-REFERENCE TO RELATED APPLICATIONS

This application is the U.S. National Phase under 35 U.S.C. § 371 of International Application No. PCT/JP2022/030568, filed on Aug. 10, 2022, the entire contents of each of which are hereby incorporated by reference.

TECHNICAL FIELD

The present invention relates to an information processing device and an information processing method for displaying a virtual object together with an object in a real space.

BACKGROUND ART

In recent years, with the spread of augmented reality (AR) technology capable of providing virtually extended reality by superimposing a virtual object in a virtual space, which is digital information created using CG (Computer Graphics) technology or the like, on a real space, an information processing device allowing a user to easily see the virtual object while viewing an object in the real space has been widely available. Such an information processing device is, for example, a head-mounted display (HMD) to be mounted on the head, a pair of AR glasses which is a digital device designed to have an eyeglass form as one of the variations of HMDs, or the like. For providing a user with an experience as if a virtual object was present in that place of the real world, there has been known an (so-called video see-through) HMD or AR glasses configured to show, on a display section provided on the front of the head, a real object in the real space and the virtual object, and an (so-called optical see-through) HMD or AR glasses in which the user views the real object in front of him or her with the virtual object being shown on the display section. The virtual object is generated with digital information including various types of display items such as text, icons, and moving images, and is shown in front of the eyes of the user so as to be visualized.

Here, for a user wearing an HMD or AR glasses and walking outside, it is preferable if he or she can easily view a display item, which is a virtual object, together with the field of view in the front. On the other hand, when the display item as a virtual object has such an influence that, for example, it obstructs the whole field of view of the user, the user may be annoyed and thus feel unpleasant in experiencing the AR technology. For this problem, as a method of reducing the influence on the field of view of a user caused by a display item, Patent Literature 1 discloses “an information processing device including a display control unit that controls the presence or absence of a display item on a display unit based on a display order of display items determined according to environment information or user information, by using a change in behavior of a user as a trigger”.

CITATION LIST

Patent Literature

Patent Literature 1: JP-A-2019-101743

SUMMARY OF INVENTION

Technical Problem

According to Patent Literature 1, the influence on the field of view of the user caused by the display item is reduce by controlling the presence or absence of a display item as a virtual object while the user is walking, however, in this technique, there is a possibility that the display item as a virtual object may not be displayed while the user is walking, which makes it difficult for the user to constantly experience the AR technology.

In view of the problems described above, the present invention provides an information processing device and an information processing method for displaying a display item positioned within a field of view display range as a virtual object together with the forward scenery in a display form allowing them to be easily viewed while a user is walking.

Solution to Problem

In the following, the representative ones of the aspects of the present invention disclosed herein will be briefly recited.

That is, the present invention provides an information processing device to be worn on a user, comprising: a display processing device configured to display an augmented reality object within a field of view display range; a walking detection sensor configured to detect a walking state of the user; and a processor, the processor being configured to execute control of: determining whether the user is walking based on sensor information by the walking detection sensor, and upon determining that the user is walking, enlarging the augmented reality object; and displaying the augmented reality object as enlarged within the field of view display range.

Furthermore, the present invention provides an information processing device to be worn on a user, comprising: a display processing device configured to display an augmented reality object within a field of view display range; a walking detection sensor configured to detect a walking state of the user; and a processor, the field of view display range having a central zone including a center point of the field of view display range and a peripheral zone located at an outer edge of the central zone, and the processor being configured to execute display control of: determining whether the user is walking based on sensor information by the walking detection sensor, and upon determining that the user is walking, moving the augmented reality object being displayed in the central zone to the peripheral zone.

Still further, the present invention provides an information processing method to be executed by an information processing device to be worn on a user, comprising: a walking determination step of determining whether the user is walking based on sensor information by a walking detection sensor configured to detect a walking state of the user; an enlargement step of enlarging an augmented reality object to be larger than that in a state where the user is stationary upon determining that the user is walking; and a display step of causing a display processing device to display the augmented reality object as enlarged.

Advantageous Effects of Invention

Using the technique according to the present invention, it is possible to provide an information processing device and an information processing method for displaying a display item positioned within a field of view display range as a virtual object together with the forward scenery in a display form allowing them to be easily viewed. The problems, configurations, and advantageous effects other than those described above will be clarified by explanation of the embodiments below.

DESCRIPTION OF EMBODIMENTS

The present invention provides an information processing device and an information processing method that contribute for a user who is walking to both improvement in the visibility of an augmented reality object and improvement in the visibility of forward scenery. Therefore, the present invention can be expected to contribute to 8.2 (Achieve higher levels of economic productivity through diversification, technological upgrading and innovation, including through a focus on high-value added and labor-intensive sectors) of the Sustainable Development Goals (SDGs) proposed by the United Nations.

Furthermore, according to the present invention, by improving the visibility of a display item, contribution to the support for people with weak eyesight is expected. Therefore, the present invention can be expected to contribute to "Goal 3: Ensure healthy lives and promote well-being for all at all ages" of the Sustainable Development Goals (SDGs) proposed by the United Nations.

First Embodiment

Figure 1:
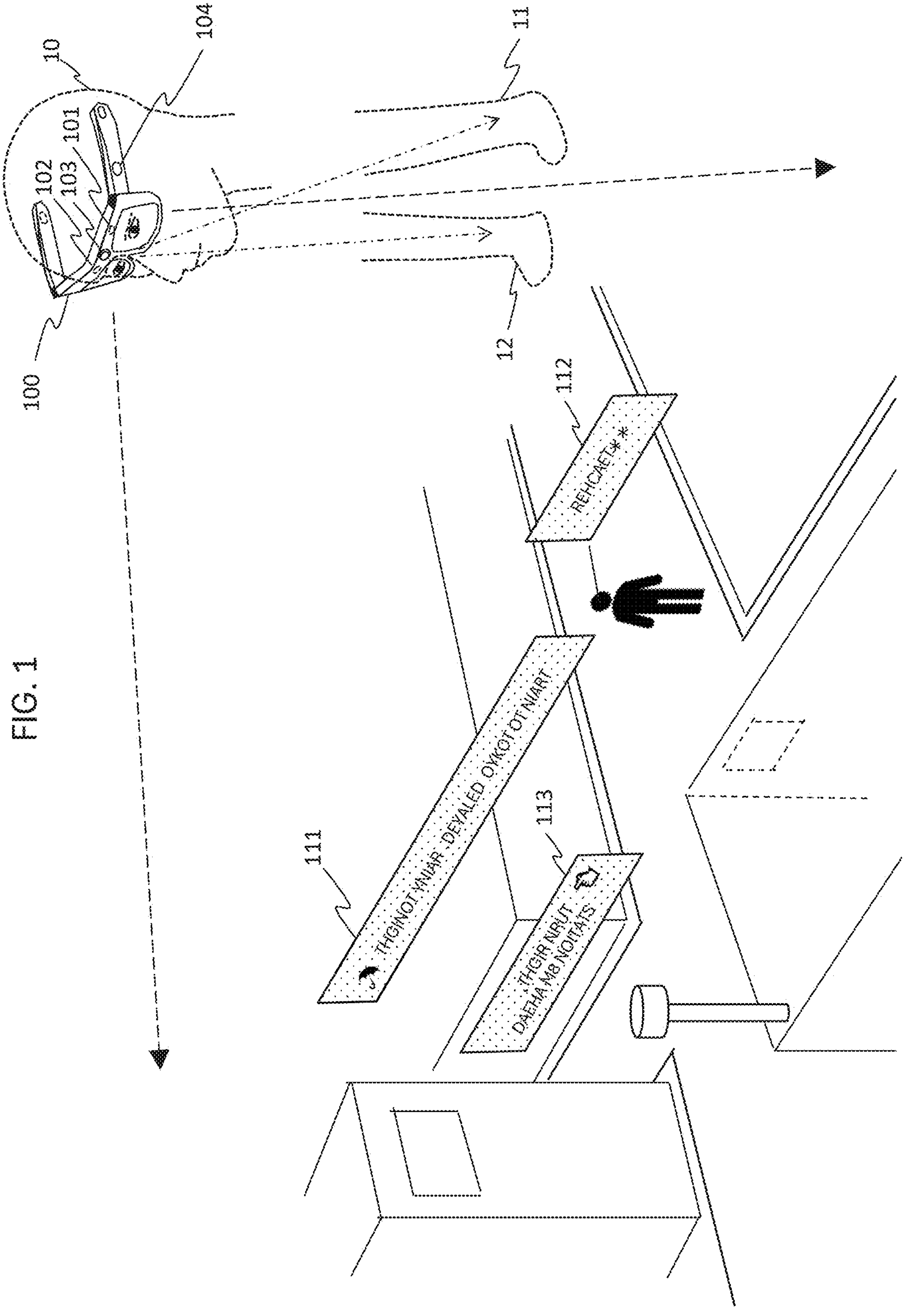
FIG. 1 is a diagram schematically illustrating an example of an information processing device according to the present embodiment.
Figure 2:
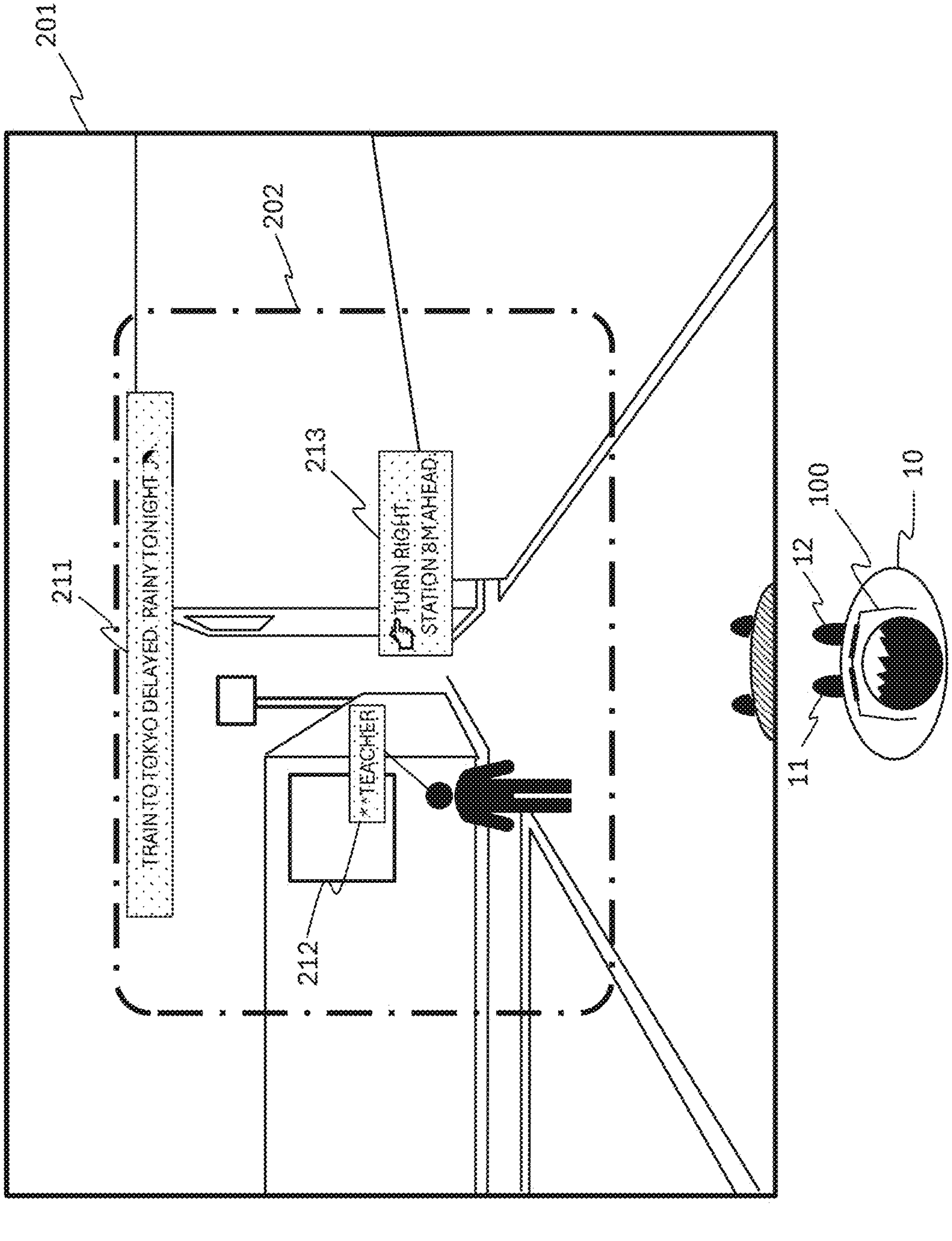
FIG. 2 is a diagram of the information processing device according to the embodiment described with reference to FIG. 1, which illustrates a forward scenery screen and a field of view display range in a user stationary state.
Figure 3:
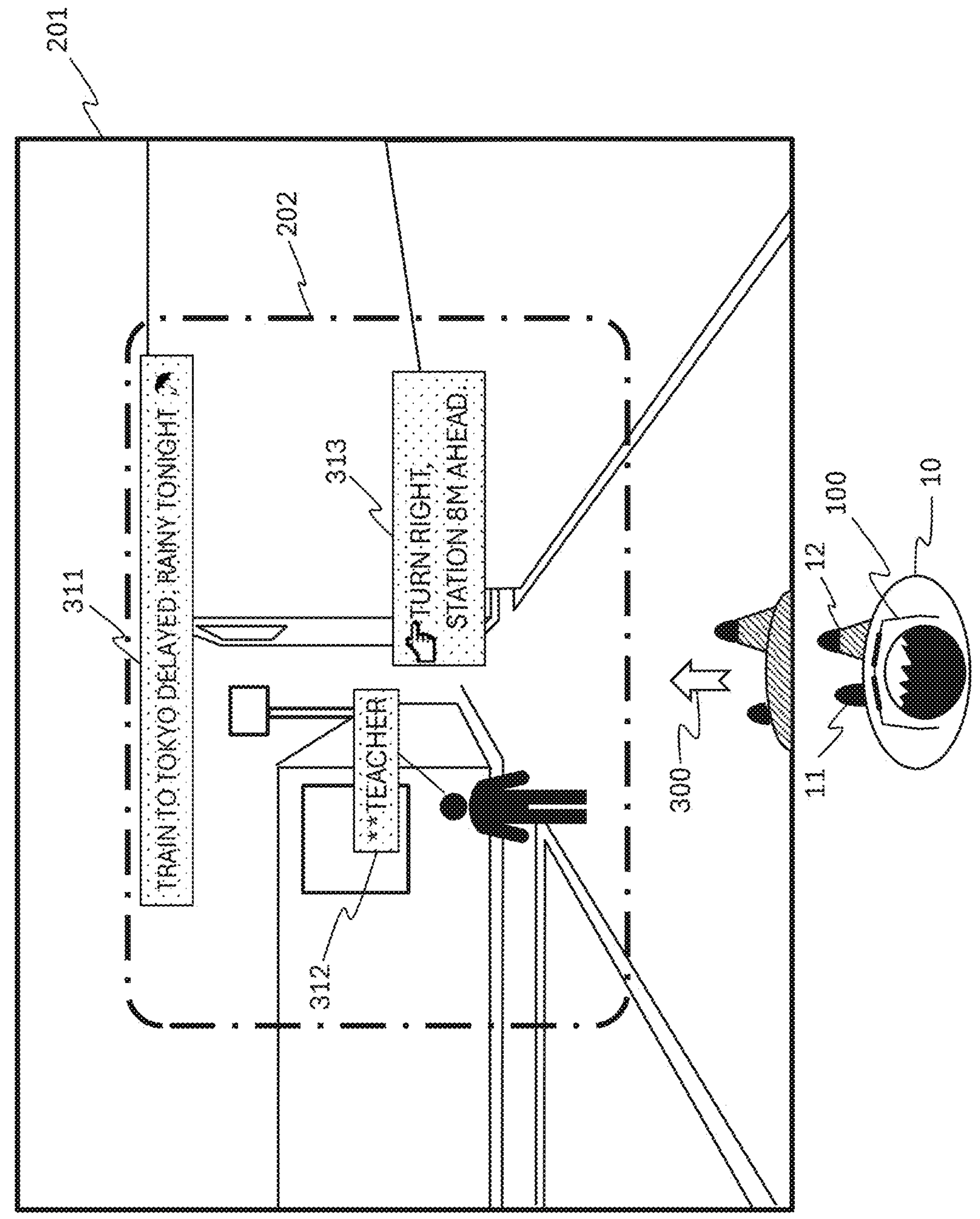
FIG. 3 is a diagram of the information processing device according to the embodiment described with reference to FIG. 1, which illustrates a case of enlarging and showing all display items in a user walking state.

Hereinafter, examples of the embodiments of the present invention will be described with reference to the drawings. As a specific example of the information processing device according to the present embodiment, a pair of AR glasses designed to have an eyeglass form as one aspect of an HMD, which is to be worn on the head of a user and configured to display information included in a real space and a virtual space so as to allow the user to see them, will be described. FIG. 1 is a diagram schematically illustrating an example of an information processing device according to the present embodiment, and each of FIG. 2 and FIG. 3 is a diagram illustrating a display screen of forward scenery and a field of view display range of the information processing device according to the present embodiment.

As illustrated in FIG. 1, a pair of AR glasses 100 is worn on the head of a user 10, and the pair of AR glasses 100 includes a left line-of-sight sensor 101 and a right line-of-sight sensor 102 for detecting the lines of sight of the left and right eyes of the user 10, respectively, a camera 103 for capturing an image of the outside, and an acceleration sensor 104 for detecting the acceleration indicative of change in the speed per unit time.

In the case of the widely used optical see-through AR glasses 100, the user 10 directly sees a real object included in the field of view around his or her front, while in the case of the video see-through AR glasses 100, the camera 103 captures an image of the real object included in the field of view around his or her front and the image of the real object as captured is shown on a display.

In addition, the pair of AR glasses 100 generates various types of display items, such as text, icons, and images, as augmented reality objects, and places the display items as generated within the field of view display range of the user 10 and shows them together with a real object. FIG. 1 illustrates the case where display items 111, 112, 113 including the text and icons such as "TRAIN TO TOKYO DELAYED. RAINY TONIGHT.", "**TEACHER", and "TURN RIGHT, STATION 8M AHEAD.", are virtually placed in the real space including real objects such as buildings, roads, and a passenger.

The field of view display range is a range for displaying, through the AR glasses 100, the real objects and the display items 111, 112, 113 as the virtual objects which are superimposed thereon.

Using the lines of sight of the user detected based on the motion of the eyeballs of the user, the field of view of the user may be set as the field of view display range. Furthermore, an area including, not only the field of view while the user is looking far from the front, but also the field of view when the user moves his or her eyeballs up, down, left, and right may be set as the field of view display range.

The AR glasses 100 use the camera 103 provided therein and capture images of the front of the user 10 and left and right feet 11, 12 of the user 10 to acquire a walking state of the user based on both the feet as captured. Thus, the AR glasses 100 obtain user walking information including, not only a walking action, a walking direction, and a walking speed, but also a relative positional relation between the feet and body of the user 10 and the AR glasses 100.

Furthermore, the AR glasses 100 use the acceleration sensor 104 provided therein to measure the acceleration in the three-dimensional direction, and analyze and detect motion information including, for example, a position, a direction, a tilting, and a vibration of the head of the user wearing the AR glasses 100.

The AR glasses 100 also can grasp the walking state of the user based on the motion information of the head of the user as analyzed and detected, so as to acquire the user walking information including a walking action, a walking direction, a walking speed, and the like.

Thus, the AR glasses 100 include a walking detection sensor configured to detect walking information including such as a walking action, a walking direction, and a walking speed of the user wearing the AR glasses 100, and the walking detection sensor is configured with the camera 103 for capturing images of the feet of the user and the acceleration sensor 104 for measuring the acceleration of the head of the user in the three-dimensional direction.

Furthermore, the AR glasses 100 include a head motion detection sensor configured to detect the motion of the head of the user wearing the AR glasses 100, and the head motion detection sensor is configured with the acceleration sensor 104 for measuring the acceleration of the head of the user in the three-dimensional direction.

Still further, the AR glasses 100 use the left line-of-sight sensor 101 and the right line-of-sight sensor 102 to detect the lines of sight of the user 10.

For the state of the user 10 wearing the AR glasses 100 as illustrated in FIG. 1, FIG. 2 schematically illustrates forward scenery 201 in front of the user, a field of view display range 202 of the AR glasses 100, and the user 10 wearing the AR glasses 100, when it is determined that the user is not walking and is stationary based on the output by the camera 103 or the acceleration sensor 104.

In FIG. 2, the user 10 who stops walking can easily see display items 211, 212, 213 within the field of view display range without feeling difficulties in seeing them even if the display items 111, 112, 113 are small in size.

Furthermore, the user 10 can grasp the whole of the forward scenery 201 by directing his or her head up, down, left, and right to move the field of view display range 202.

FIG. 3 illustrates a display example when the user 10 who was stationary in FIG. 2 starts walking.

The user 10 walking in the front direction indicated using an arrow 300 pays attention to the display items 211, 212, 213 while mainly seeing the scenery within the field of view display range 202 which is located in the direction in which he or she is advancing by walking. In this case, the smaller the display items included within the field of view display range 202 are, the more it becomes difficult for the user 10 to see and read them. This causes the reduction in the visibility of the display items included within the field of view display range.

For this case, as illustrated in FIG. 3, it is configured to enlarge greatly the display items 211, 212, 213 which are the virtual objects so as to show them as display items 311, 312, 313 when the walking detection sensor configured to analyze the output by the camera 103 or the acceleration sensor 104 determines that the user 10 is walking. This enables the user who is walking to easily see and read the display items that have been greatly enlarged and shown, and thus can realize the significant improvement in the visibility of the display items as the virtual objects.

The display items may be enlarged by increasing the size of the display items per se, or increasing the size of the text or icons provided in the display items. If the display item as enlarged is too large to block the field of view, the number of characters to be shown may be limited to reduce the amount of display information or the spaces between the characters may be narrowed.

Second Embodiment

A second embodiment will be described with reference to FIG. 4. The features similar to those illustrated in FIG. 2 and FIG. 3 are provided with the same reference signs, and will not be described in detail herein.

The user who is walking mainly directs the lines of sight toward a central zone 250 within the field of view display range 202 to which he or she is advancing by walking while trying not to focus them on peripheral portions, for the safety of the front in the walking direction and the feet. Accordingly, within the field of view display range 202, the user visibility is relatively good in the central zone 250, however, the visibility of the display item in a peripheral zone 260 is less than that positioned in the central zone 250.

For this case, it is configured to, during user walking, enlarge the display item 211 illustrated in FIG. 2 which is positioned in the peripheral zone 260 within the field of view display range 202 and show it as the display item 311 in the same manner as FIG. 3, while leaving the display items 212, 213 illustrated in FIG. 2 which are positioned in the central zone 250 within the field of view display range 202 unchanged. This enables the enhancement in the visibility of the display item positioned in the peripheral zone 260 where, during user walking, the user's lines of sight are unlikely to reach more than in the central zone 250 within the field of view display range 202, and thus enables the display item positioned in the peripheral zone 260 to be viewed as much as the display item positioned in the central zone 250.

Herein, the central zone 250 corresponds to a zone within a predetermined range including the center point of the field of view display range 202 and the peripheral zone 260 corresponds to a zone located around the central zone 250. The "predetermined range" may be set in advance, or may be narrowed or widened depending on the walking state. For example, the "predetermined range" may be relatively narrowed when the walking speed is relatively high, and the "predetermined range" may be relatively widened when the walking speed is relatively low.

In the embodiment illustrated in FIG. 3, the display items 312, 313 in the central zone 250 which have been enlarged may largely block the forward scenery during walking, which may cause the user to feel difficulties in seeing the forward scenery. On the other hand, in the embodiment illustrated FIG. 4, the display item positioned in the peripheral zone 260 is enlarged while the display item positioned in the central zone 250 is kept in the same size to minimize the influence on the forward scenery. This enables the improvement in the visibility.

Third Embodiment

A third embodiment will be described with reference to FIG. 5. The features similar to those illustrated in FIG. 2, FIG. 3, and FIG. 4 are provided with the same reference signs, and will not be described in detail herein.

Figure 4:
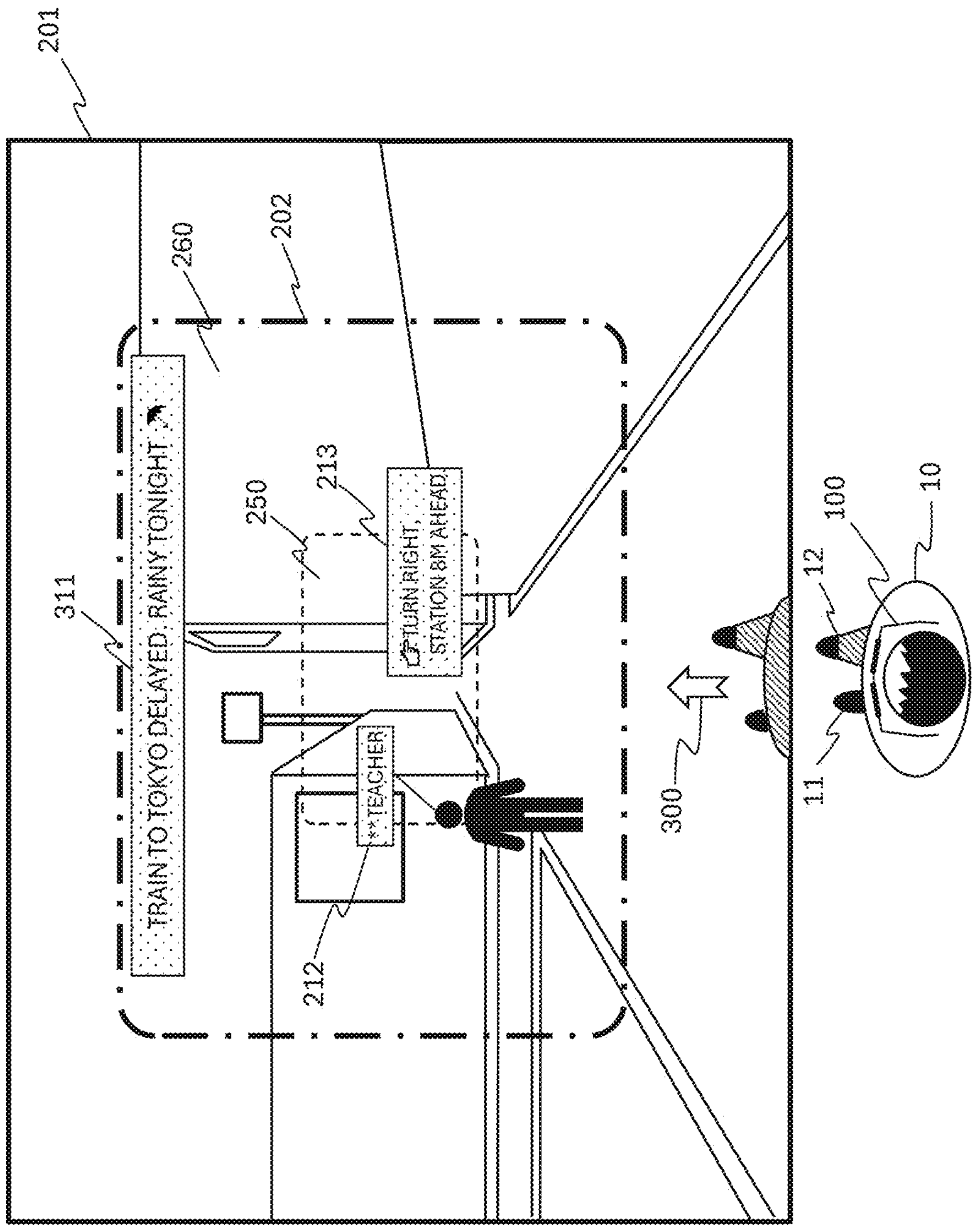
FIG. 4 is a diagram of the information processing device according to the embodiment described with reference to FIG. 1, which illustrates a case of greatly enlarging and showing a display item positioned in a peripheral portion in a user walking state.

The third embodiment differs from the embodiments illustrated in FIG. 3 and FIG. 4 in the display size of the display items 212, 213 illustrated in FIG. 2 which are positioned in the central zone 250 within the field of view display range 202. In FIG. 3, the display items 212, 213 are enlarged to be the display items 312, 313 and, in FIG. 4, the display items 212, 213 remain unenlarged. On the other hand, in FIG. 5, the display items 212, 213 are enlarged to be display items 512, 513 with the enlargement ratio being lower than that of the display item 311 positioned in the peripheral zone.

The visibility of the display item during user walking is high in the peripheral zone 260 while it is low in the central zone 250, however, the dynamic visual acuity tends to be lower than the static visual acuity. Using the characteristics, during user walking, the display item in peripheral zone 260 is enlarged so as to secure the visibility thereof while preventing the visibility of scenery in the central zone 250 included within the field of view display range 202 from being blocked by the display item.

Figure 5:
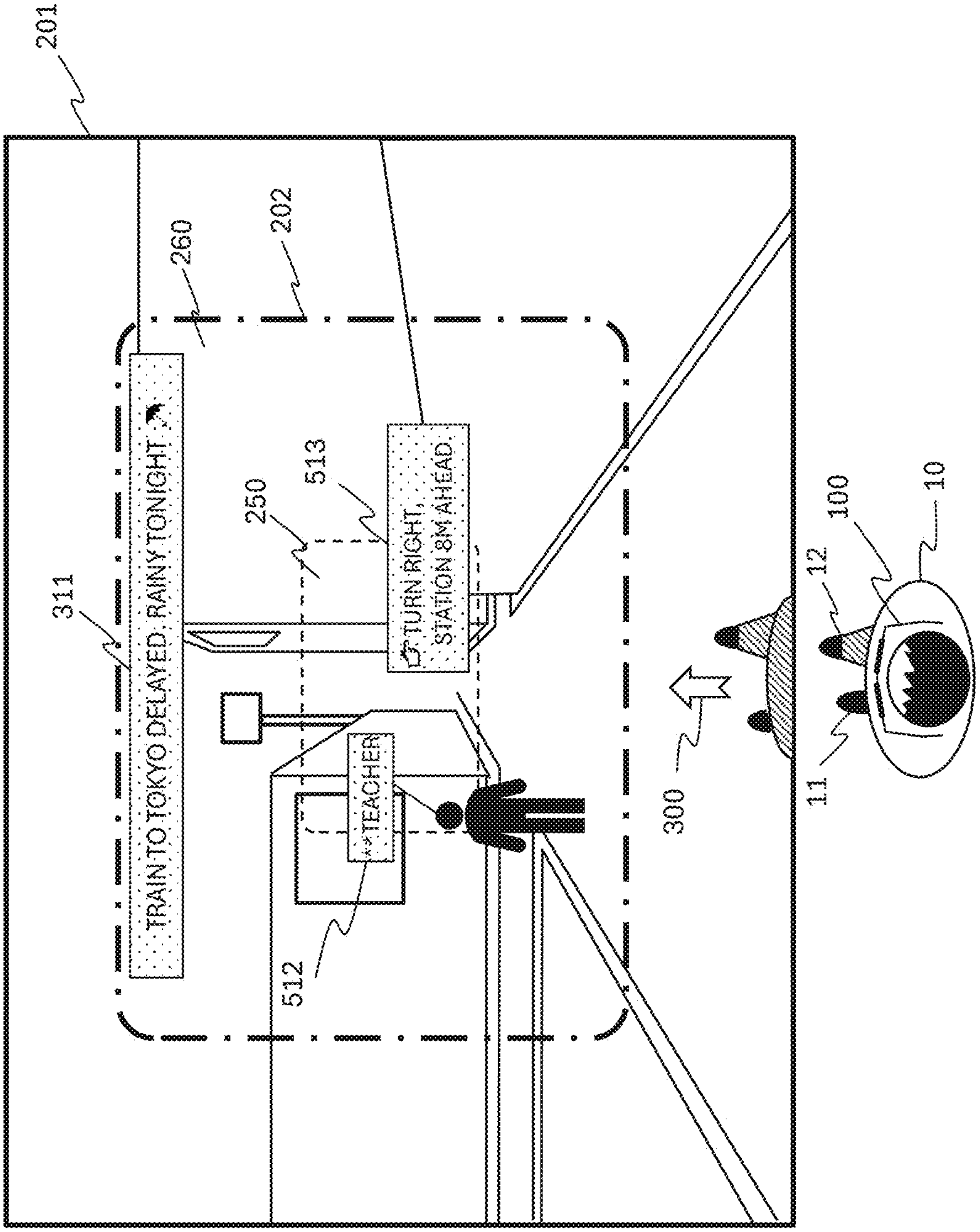
FIG. 5 is a diagram of the information processing device according to the embodiment described with reference to FIG. 1, which illustrates a case of greatly enlarging and showing a display item positioned in a peripheral portion and slightly enlarging a display item positioned in a central zone, in a user walking state.

FIG. 5 illustrates the case of changing the size of the display items positioned in the central zone and the peripheral zone by two-stage switching, however, it may be configured to change the display size from the center to the periphery within the field of view display range by multiple-stage switching or in a smooth manner. By controlling the display size in multiple stages or smoothly, the advantageous effect of balancing between the suppression of blocking of scenery and ensuring of the visibility can be further exhibited.

Fourth Embodiment

With reference to the embodiment illustrated in FIG. 4 for the case of walking toward the front, the display item display operation of the information processing device when the user, who was stationary or started walking toward the front, has started heading diagonally left or right will be described using FIG. 6A and FIG. 6B.

Figure 6A:
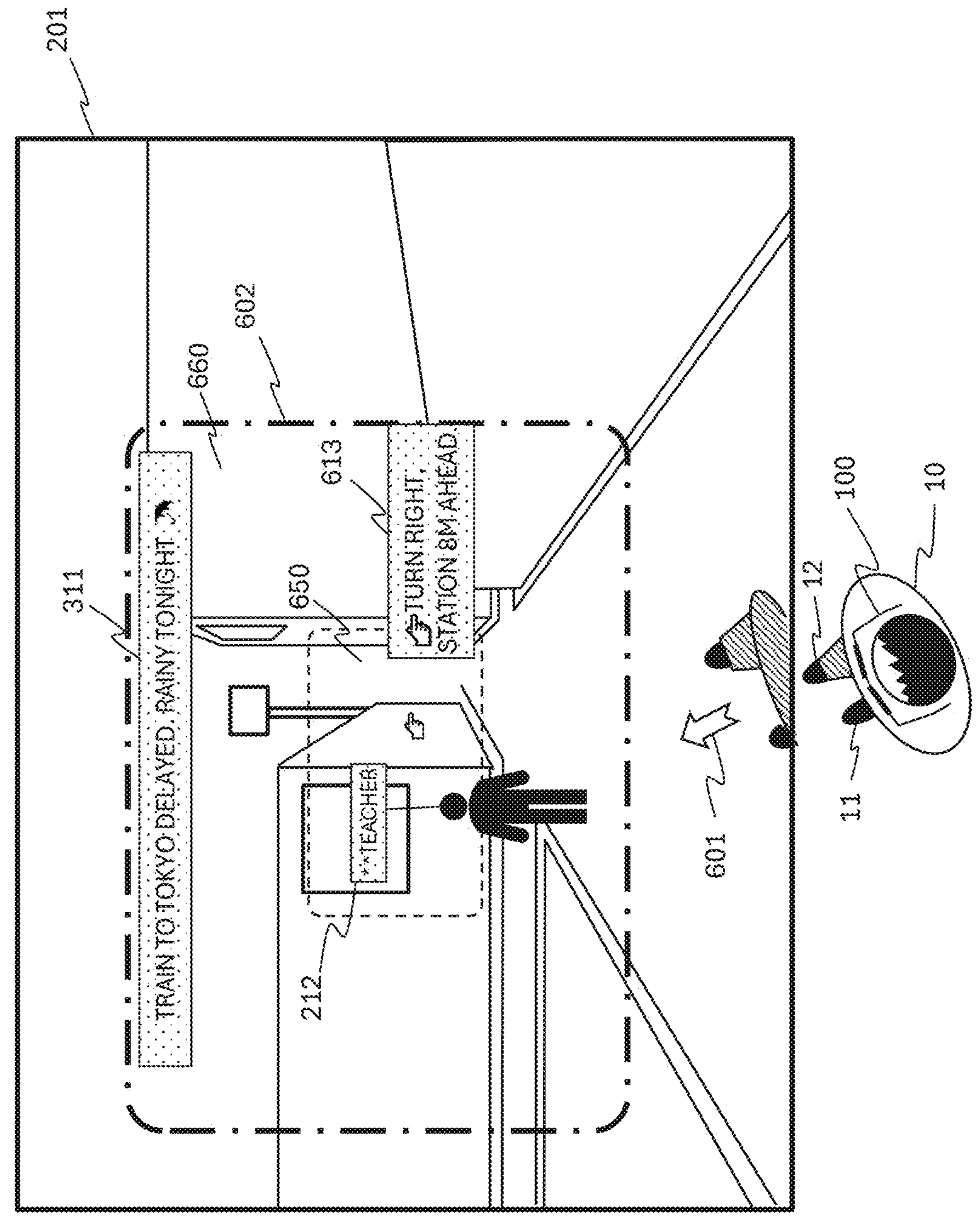
FIG. 6A is a diagram of the information processing device according to the embodiment described with reference to FIG. 1, which illustrates a case of greatly enlarging and showing a display item that has moved to a peripheral portion during walking diagonally to the left.
Figure 6B:
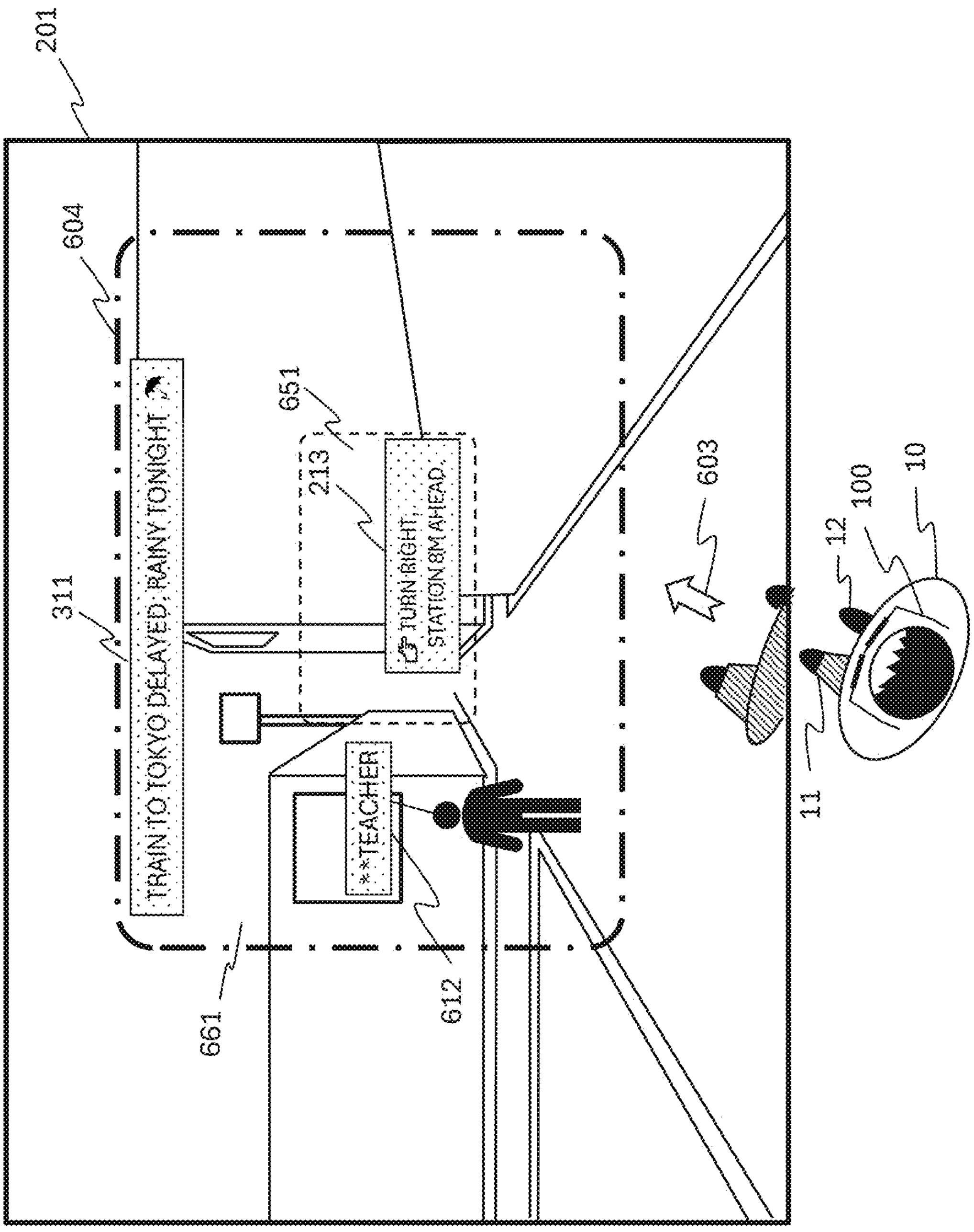
FIG. 6B is a diagram of the information processing device according to the embodiment described with reference to FIG. 1, which illustrates a case of greatly enlarging and showing a display item that has moved to a peripheral portion during walking diagonally to the right.

With respect to the forward scenery 201 when the user is stationary, FIG. 6A illustrates a field of view display range 602 of the AR glasses 100 and a display state of the display items while the user is walking diagonally to the left, and FIG. 6B illustrates a field of view display range 604 of the AR glasses 100 and a display state of the display items while the user is walking diagonally to the right. In FIG. 6A and FIG. 6B, the portions illustrated in FIG. 4 and provided with the same reference signs function in the same manner as those previously illustrated in FIG. 4, and thus will not be described in detail herein.

In FIG. 6A, in response to an action of the user who is walking with the head being directed diagonally to the left as indicated with an arrow 601, the field of view display range of the AR glasses 100 moves to the left by an amount corresponding to the direction in which the user is walking diagonally to the left, as illustrated with the field of view display range 602. This also causes the change in the position of a central zone 650 and that of a peripheral zone 660 within the field of view display range 602. In accordance therewith, the display item 213 illustrated in FIG. 2 and FIG. 4, which was positioned in the central zone 250 of the field of view display range 202 (for example, FIG. 5) while the user was stationary or when the user was walking to the front, moves to the peripheral zone 660 of the field of view display range 602 where the lines of sight of the user are unlikely to reach.

Thus, while the user is walking diagonally to the left, showing the display item 213, which has moved to the peripheral zone 660, in a relatively small display size as it is causes difficulties for the user to see the display item 213.

For this case, in the fourth embodiment, it is configured to enlarge greatly the display item 213 that has moved to the peripheral zone 660 in response to the action of the user who is walking diagonally to the left and show it as a display item 613. That is, enlarging greatly a display item that has moved to the peripheral zone 660 during walking diagonally to the left and showing it enables the improvement in the visibility of the display item that has moved to the peripheral zone 660.

On the other hand, the display item 212 is left with the display size being unchanged since it is included in the central zone 650 within the field of view display range 602.

FIG. 6B illustrates the case of walking diagonally to the right, and in response to an action of the user who is walking diagonally to the right as indicated with an arrow 603, the field of view display range of the AR glasses 100 moves to the right by an amount corresponding to the direction in which the user is walking diagonally to the right, as illustrated with a field of view display range 604. This also causes the change in the position of a central zone 651 and that of a peripheral zone 661 within the field of view display range 604. For this case, the display item 212 that has been positioned in the peripheral zone 661 in response to the action of the user who is walking diagonally to the right is enlarged greatly and shown as a display item 612. This enables the improvement in the visibility of the display item that has moved to the peripheral zone 661 during walking diagonally to the right.

On the other hand, the display item 213 is left with the display size being unchanged since it is included in the central zone 651 within the field of view display range 604.

In FIG. 6A and FIG. 6B, in the same manner as the case where the user is stationary or walking to the front, in the case of walking diagonally to the left as well, enlarging greatly the display item 211 positioned in the peripheral zones 660, 661 within the field of view display ranges 602, 604 and showing it as the display item 311 enables the improvement in the visibility of the display item 211.

As described above with reference to FIG. 6A and FIG. 6B, while the user is walking to the front or walking diagonally left or right, enlarging greatly the display item positioned in the peripheral zone within the field of view display range and showing it allows the user to easily see the display item positioned in a peripheral portion within the field of view display range as a virtual object, while avoiding the lines of sight from focusing on the field of view peripheral portion.

Fifth Embodiment

Figure 7A:
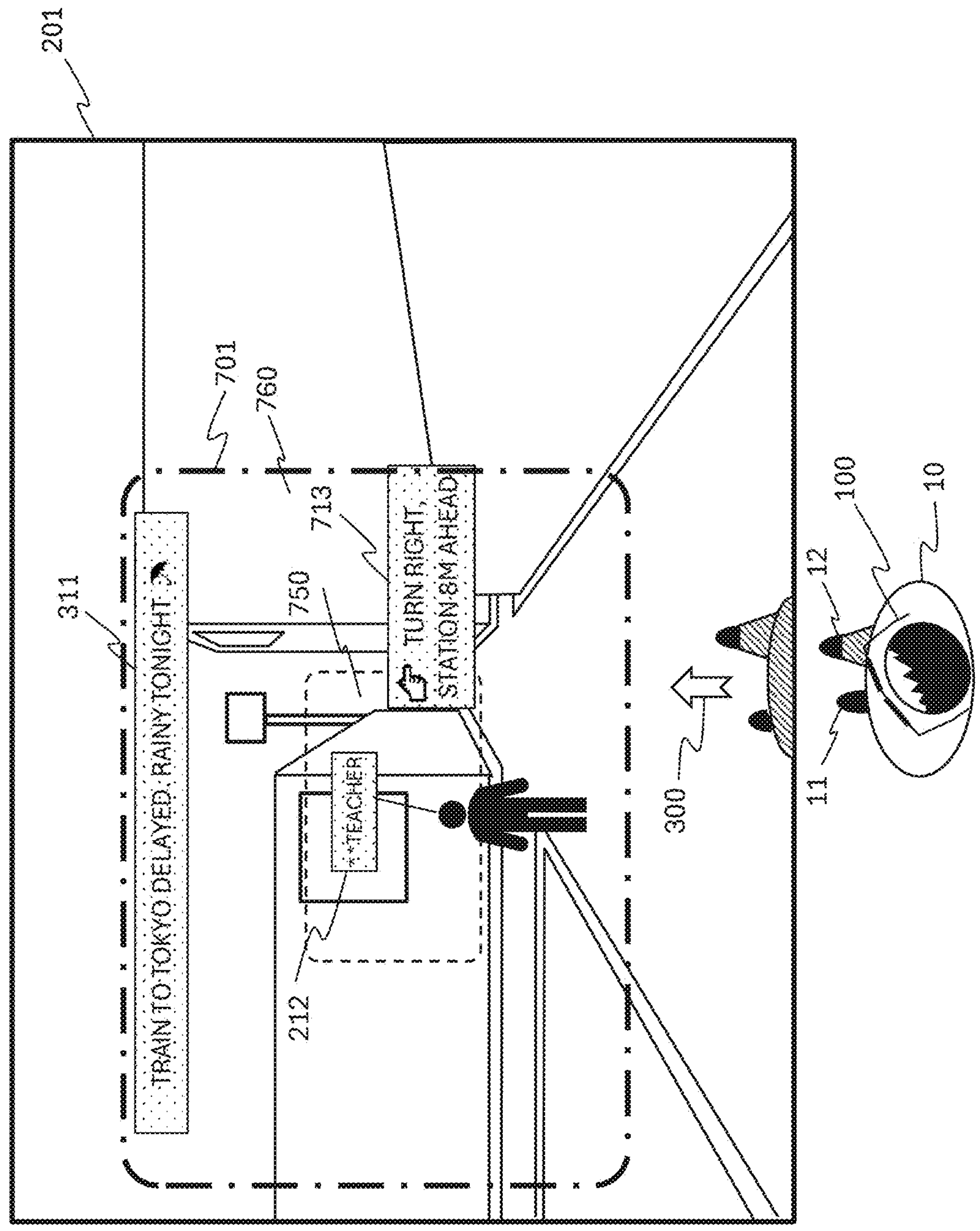
FIG. 7A is a diagram of the information processing device according to the embodiment described with reference to FIG. 1, which illustrates a case where a user walking to the front has turned his or her head toward the left.
Figure 7B:
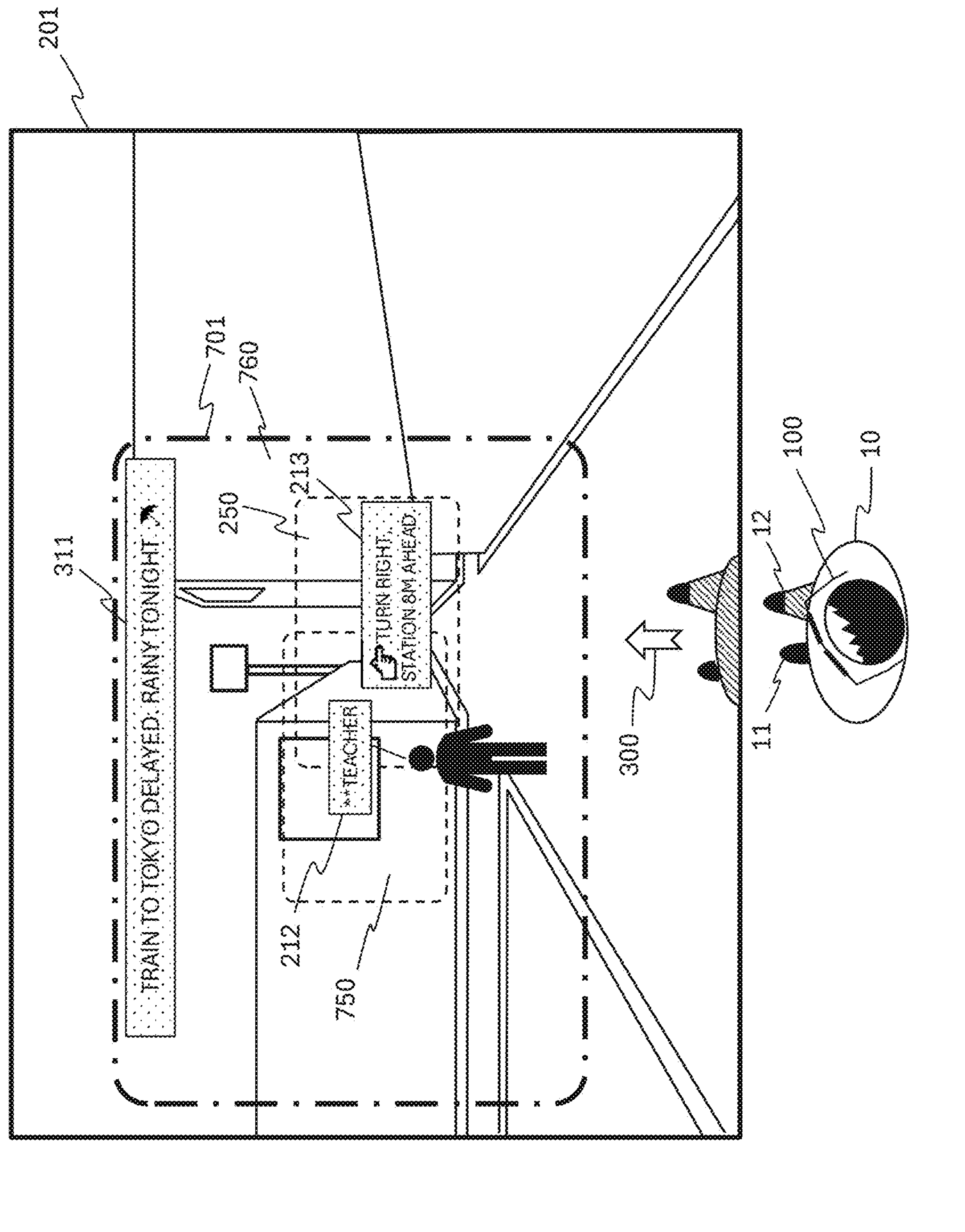
FIG. 7B is a diagram of the information processing device according to the embodiment described with reference to FIG. 1, which illustrates a further case where a user walking to the front has turned his or her head toward the left.
Figure 7C:
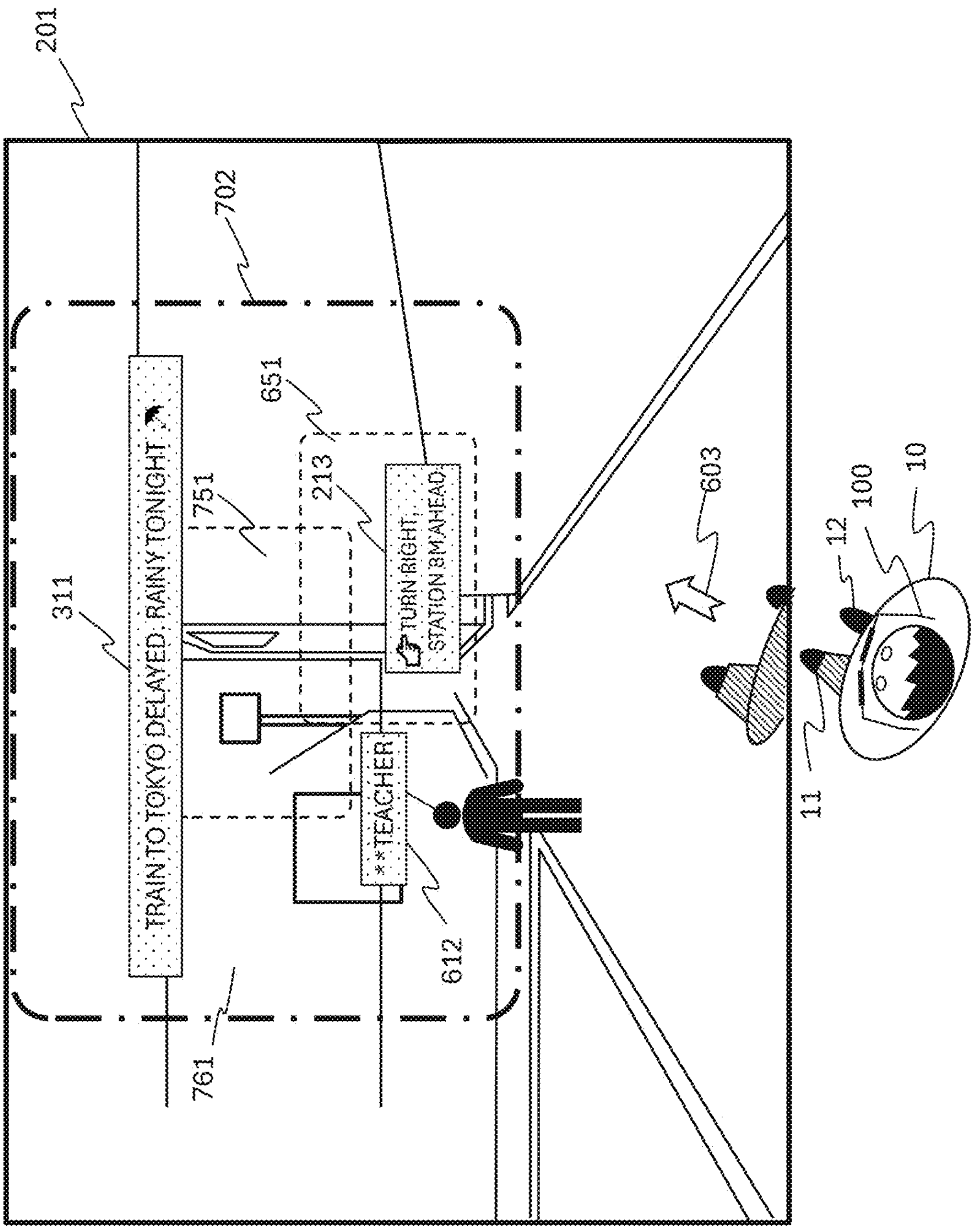
FIG. 7C is a diagram of the information processing device according to the embodiment described with reference to FIG. 1, which illustrates a case where a user walking diagonally to the right has turned his or her head upwardly to the left.

Next, with reference to FIG. 7A, FIG. 7B, and FIG. 7C, a display operation in the field of view display range of the information processing device when the user turns his or her head to the left, right, up, or down during walking and thus a motion of the head is found. In FIG. 7A, FIG. 7B, and FIG. 7C, the portions illustrated in FIG. 4 and FIG. 6B and provided with the same reference signs function in the same manner as those previously illustrated in FIG. 4 and FIG. 6B, and thus will not be described in detail herein.

FIG. 7A illustrates the case where the user 10 walking to the front turns his or her head to the left. In FIG. 7A, the field of view display range 202 illustrated in FIG. 4 has moved to the left and becomes a field of view display range 701. For this case, a display item 713 positioned in a peripheral zone 760 within the field of view display range 701 is shown in a larger display size than that of the display item 213 positioned in the central zone 250 within the field of view display range 202 illustrated in FIG. 4.

On the other hand, the display item 212 positioned in the central zone 250 within the field of view display range 202 illustrated in FIG. 4 remains as well in a central zone 750 within the field of view display range 701 illustrated in FIG. 7A, and thus is left with the display size being unchanged.

FIG. 7A illustrates the case where the user 10 stops and turns only the head toward the left. On the other hand, FIG. 7B illustrates further display control which would be carried out when the user who is walking changes the orientation of the head.

Based on the motion of the head of the user 10 which is made, for example, by an action of the user 10 who turns the head to the left, right, up or down during walking, it is considered that, firstly, the user 10 got interested in, for example, something in the left and thus turned his or her head to the left. Accordingly, at that time, it is less likely for the user 10 to intend to see and read a display item positioned in the peripheral zone 760 on the right side which is opposite to the direction in which the central zone 750 within the field of view display range 701 has moved. Thus, there is less necessity to enlarge and show a display item which has moved to the peripheral zone 760 within the field of view display range 701 in response to the action of the user who turned the head.

In addition, the change in the display state including such as the display size and display position of the display item in accordance with the motion of the head may distract the user from paying attention to the direction to which he or she has turned. Furthermore, the situation where the display state of the display item changes although the scenery in the field of view does not change when the head moves may cause the screen in the field of view display range to be inconsistent and thus adversely affect the visibility of the screen for the user.

For this case, in the embodiment illustrated in FIG. 7B, even if the acceleration sensor 104 as a head motion detection sensor detects the motion of the head of the user during walking, when the walking direction is maintained, the central zone 250 and display state of the display item before the motion of the head occurred (that is, the same central zone and display state as those illustrated in FIG. 4) is maintained as it is so as to prevent the display state of the display item from changing.

When the user 10 turns the head to the left with respect to the front of the direction to which he or she is walking, the field of view display range 202 of the embodiment illustrated in FIG. 4, which corresponds to the case where the user 10 directs the head to the front of the walking direction, moves and becomes the field of view display range 701. In FIG. 7A, the display item 713 that has been enlarged is shown, however, in FIG. 7B, the display item 213 is shown in the same display size as that illustrated in FIG. 4.

According to the present embodiment, the display size does not change while the walking direction is maintained, which can prevent the user from being distracted by the change in the display size and thus realize a stable display.

FIG. 7C illustrates the case where the user 10 walking diagonally to the right turns his or her head upward to the left.

When the user 10 turns his or her head upward to the left during walking diagonally to the right as illustrated in FIG. 6B, the field of view display range 604 moves to an upper portion of the center of the forward scenery 201 and becomes a field of view display range 702 illustrated in FIG. 7C. In FIG. 7C, a central zone 751 within the field of view display range 702 does not include any display item, and in the same manner as the case illustrated in FIG. 7A, the display items 311, 612, 213 positioned in a peripheral zone 761 within the field of view display range 702 may be enlarged and shown.

However, in FIG. 7C, it is configured to maintain the display size illustrated in FIG. 6B, which is for the case of directing the head diagonally to the right direction corresponding to the walking direction, so as to suppress the change in the display state caused by the motion of the head, while allowing only the field of view display range 604 illustrated in FIG. 6B to move and become the field of view display range 702 as illustrated in FIG. 7C. Thus, the display items 311, 612 positioned in the peripheral zone 661 within the field of view display range 604, which corresponds to the case where the user directs the head in the walking direction, are enlarged and shown but the display item 213 positioned in the central zone 651 within the field of view display range 604 illustrated in FIG. 6B is not enlarged.

That is, as a criterion to discriminate between the central zone and the peripheral zone when only the head moves while a walking direction is maintained, which serves as a criterion to determine the display size of a display item, in FIG. 7A, an actual field of view display range, which corresponds to the field of view display range 701 that move in accordance with the motion of the head is set, while, in FIG. 7B and FIG. 7C, a front field of view display range when the head is directed in the walking direction is set. In this connection, in either of the cases illustrated in FIG. 4, FIG. 5, FIG. 6A, and FIG. 6B, the head is directed in the walking direction, and thus the actual field of view display range and the front field of view display range coincide with each other.

Which of the actual field of view display range or the front field of view display range is to be set as the display size determination criterion may be switched by the user.

It may be automatically switched so as to set the front field of view display range as a criterion when the orientation of the body or feet coincides with the walking direction, and to set the actual field of view display range as a criterion in the case of determining they does not coincide, for example, in the case of "crab walk" (moving laterally with the body facing the front).

Furthermore, when the head is shifted by a predetermined angle relative to the walking direction or the front of the body, for example, by approximately 10 degrees or more, it can be considered that the user intends to carefully see the direction other than the walking direction. In this case, it may be switched so as to prioritize the actual field of view display range after a predetermined period of time, for example, approximately 0.5 seconds, passes. Still further, it may be controlled so as to decrease the predetermined period of time as the predetermined angle increases.

Sixth Embodiment

With reference to FIG. 8A, FIG. 8B, FIG. 8C, and FIG. 8D, the display item display operation of the information processing device in the case of dividing a peripheral zone within a field of view display range into a plurality of peripheral zones, and during walking, moving a display item positioned in a central zone within the field of view display range to a peripheral zone as divided and enlarging it will be described. In these drawings, the portions illustrated in FIG. 3 and FIG. 4 and provided with the same reference signs function in the same manner as those already described, and thus will not be described in detail herein.

Figure 8A:
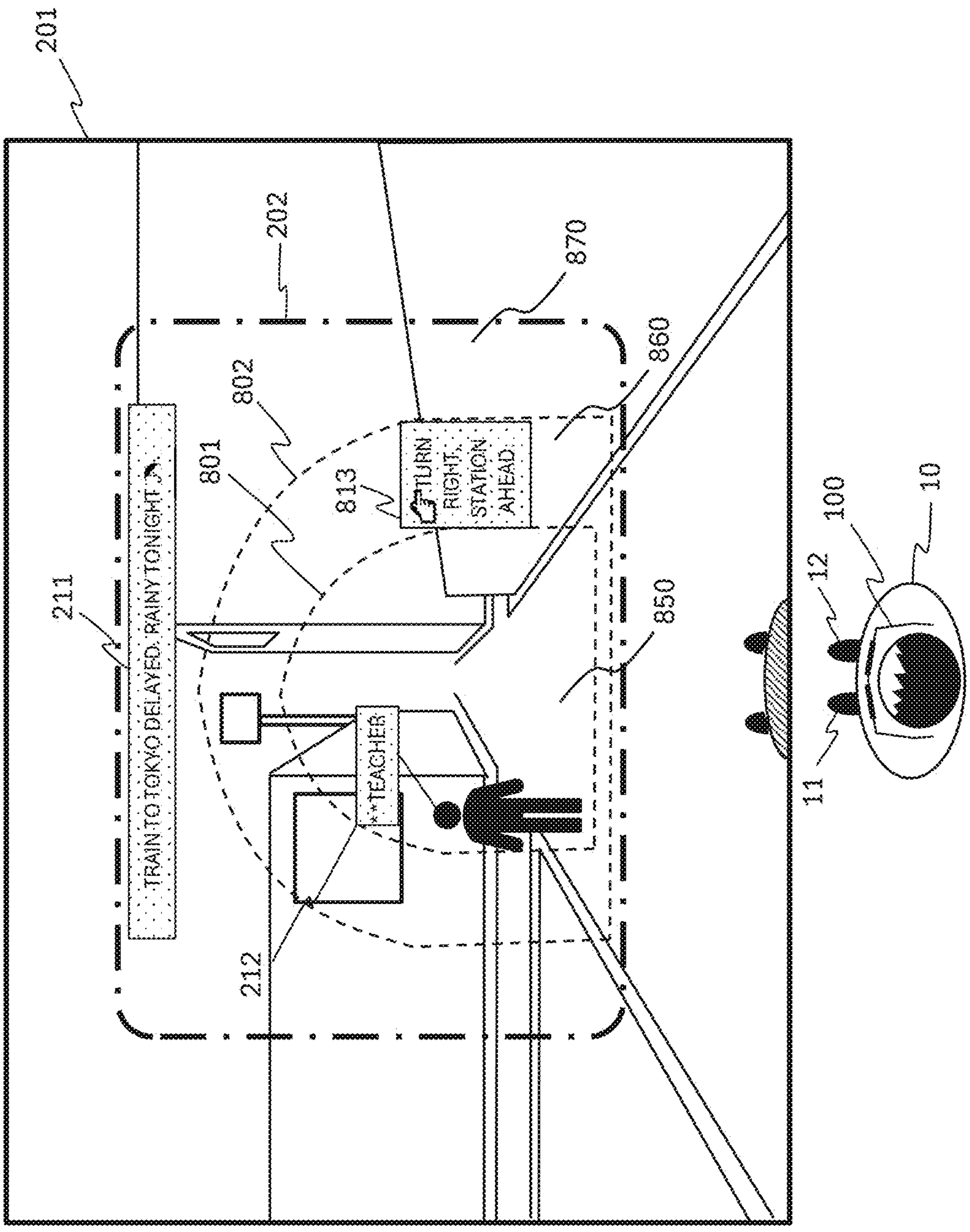
FIG. 8A is a diagram of the information processing device according to the embodiment described with reference to FIG. 1, which illustrates an example of the relation among a front scenery screen, a field of view display range, a central zone, a first peripheral zone, and the second peripheral zone, in a user stationary state.

FIG. 8A illustrates an example of division of a peripheral zone, in which a central zone 850 is the area closest to the center and surrounded by a dashed-line frame 801, a first peripheral zone 860 is the area located on the outside of the dashed-line frame 801 and on the inside of a dashed-line frame 802, and a second peripheral zone 870 is the area located on the outside of the dashed-line frame 802 and on the inside of the field of view display range 202.

As illustrated in FIG. 8A, when the user 1 is stationary, the display item 212 is shown in the central zone 850, the display item 813 is shown in the first peripheral zone 860, and the display item 211 is shown in the second peripheral zone 870.

When the user 10 who has been stationary starts walking to the front direction, it is preferable to delete or move a display item positioned in the central zone 850 so that the user 10 can easily see an obstacle or the like in the walking direction. For this case, in FIG. 8B, it is configured to move the display item 212 positioned in the central zone 850 in FIG. 8A to the first peripheral zone 860 and show it as a display item 812, so as to provide the field of view in front of the walking direction.

The display item 813 positioned in the first peripheral zone 860 is shown without being enlarged in the same manner as that illustrated in FIG. 8A, and the display item 211 positioned in the second peripheral zone 870 in FIG. 8A is enlarged and shown as a display item 511. Thus, in FIG. 8B, the display item positioned in the peripheral zone is enlarged to enhance the visibility of the display item while providing the visibility of the scenery in the walking direction.

Figure 8B:
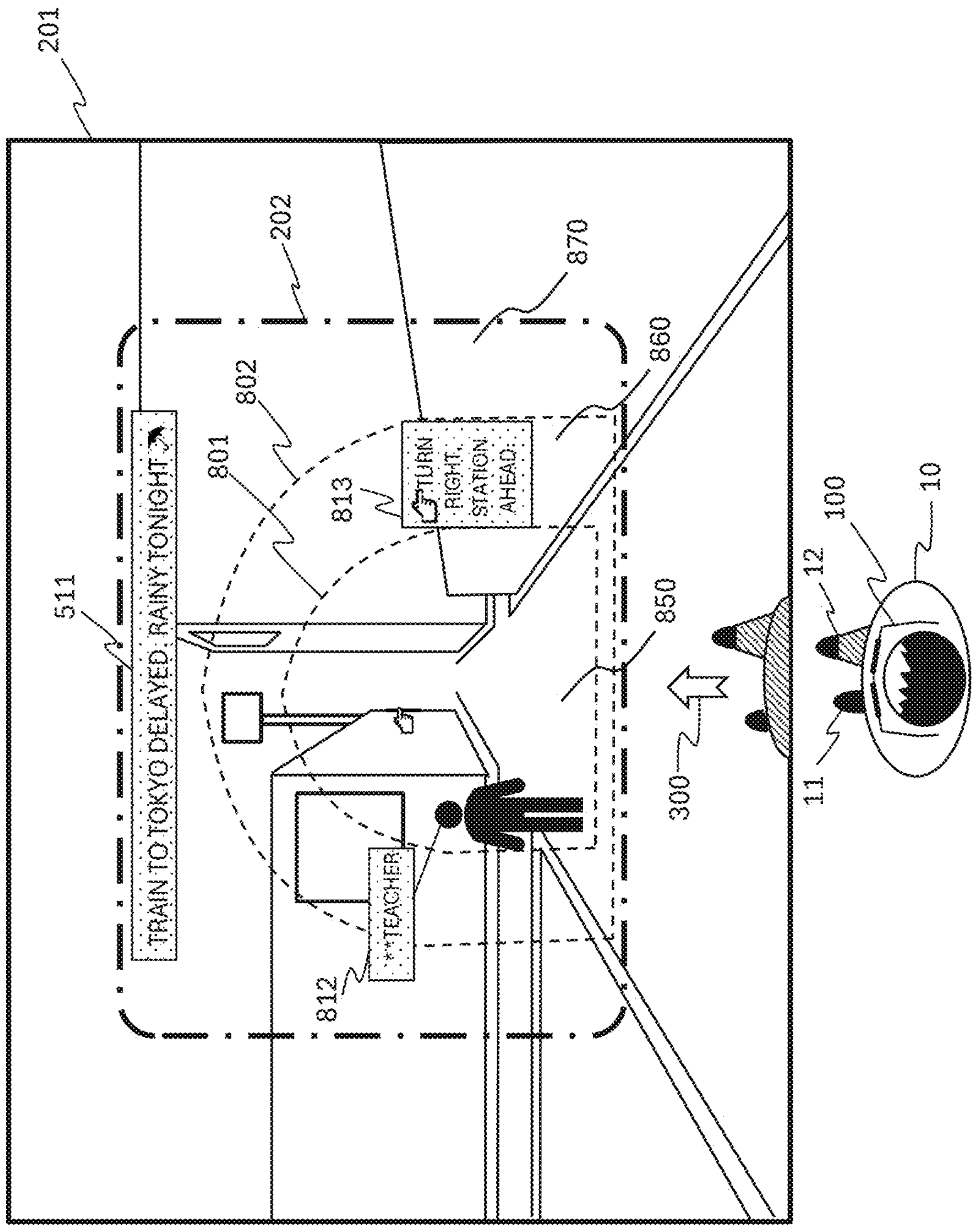
FIG. 8B is a diagram of the information processing device according to the embodiment described with reference to FIG. 1, which illustrates a case of moving a display item positioned in a central zone to a first peripheral zone, in a user walking state.
Figure 8C:
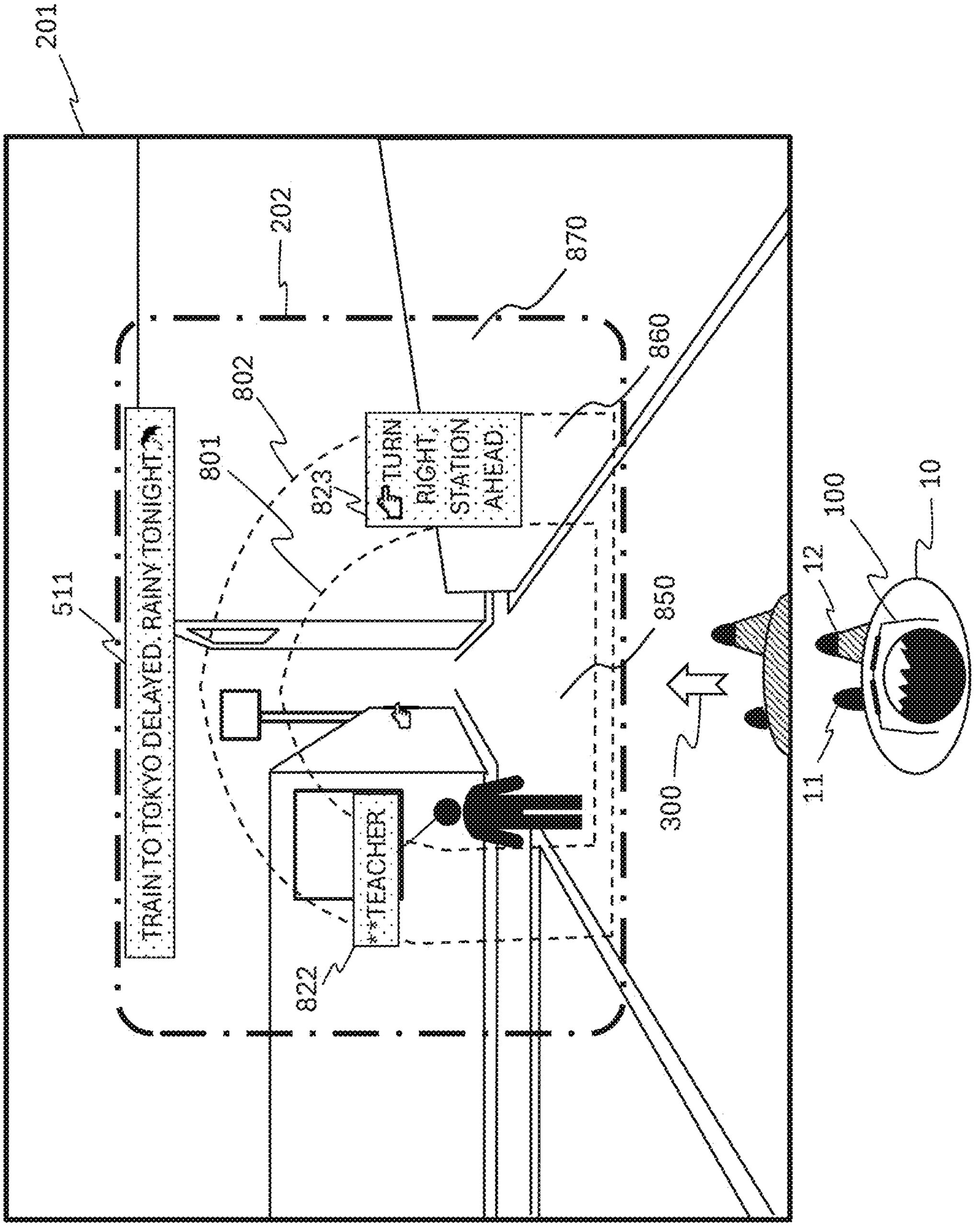
FIG. 8C is a diagram of the information processing device according to the embodiment described with reference to FIG. 1, which illustrates a case of moving a display item positioned in a central zone to a first peripheral zone and enlarging it, in a user walking state.

FIG. 8C illustrates the example of enlarging and showing a display item positioned in the first peripheral zone 860 in FIG. 8B to improve the visibility of the display item while providing the visibility of the scenery in the walking direction.

In FIG. 8C, it is configured to move the display item 212 positioned in the central zone 850 in FIG. 8A to the first peripheral zone 860, and moreover, enlarge it as a display item 822. The display item 813 shown in the first peripheral zone 860 in FIG. 8A is enlarged as a display item 823, and the display item 211 positioned in the second peripheral zone 870 in FIG. 8A is enlarged as the display item 511. In this process, enlarging the display item 511 positioned in the second peripheral zone 870 more than the display items 822, 823 positioned in the first peripheral zone 860 enables enhancement in both the visibility of the scenery in the walking direction and the visibility of the display item as enlarged in the periphery.

Figure 8D:
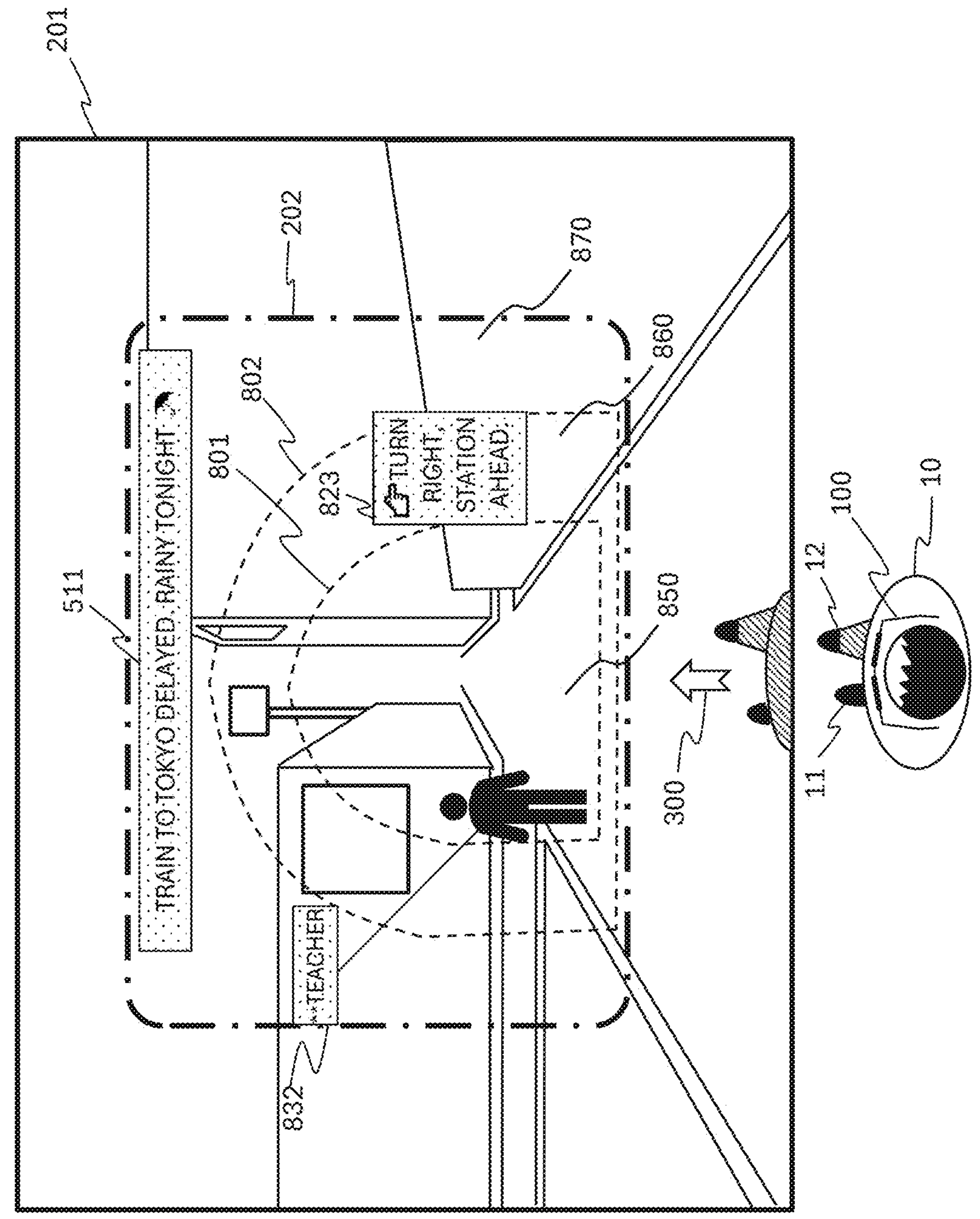
FIG. 8D is a diagram of the information processing device according to the embodiment described with reference to FIG. 1, which illustrates a case of moving a display item positioned in a central zone to a second peripheral zone and enlarging it, in a user walking state.

FIG. 8D illustrates the example of moving the display item 212 positioned in the central zone 850 in FIG. 8A to the second peripheral zone 870, and moreover, enlarging it as a display item 832. In this example, the display item 832 is shown in the same size as the display item 511 shown in the second peripheral zone 870. Thus, changing the size of the display item stepwise depending on the peripheral zone to which it moves enables enhancement in both the visibility of the scenery in the walking direction and the visibility of the display item as enlarged in the periphery.

Seventh Embodiment

Figure 9A:
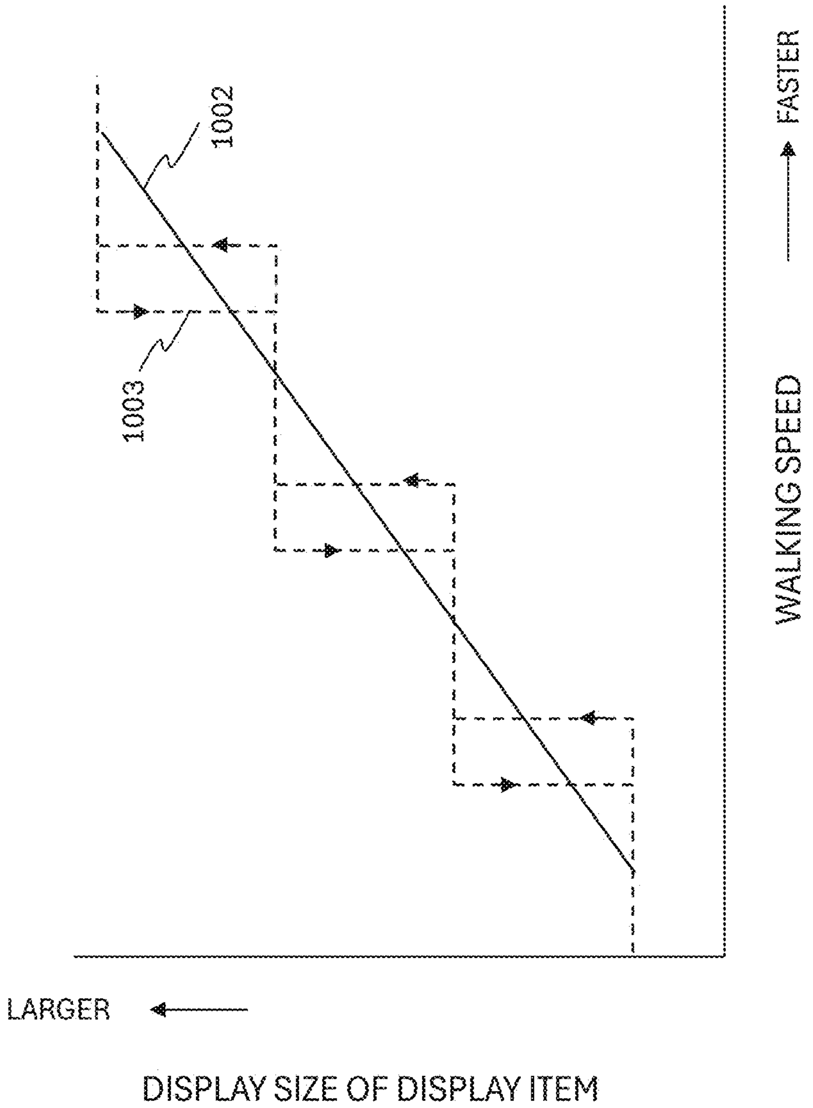
FIG. 9A is a diagram of the information processing device according to the embodiment described with reference to FIG. 1, which illustrates an example of the relation between the walking speed and the display size of a display item.
Figure 9B:
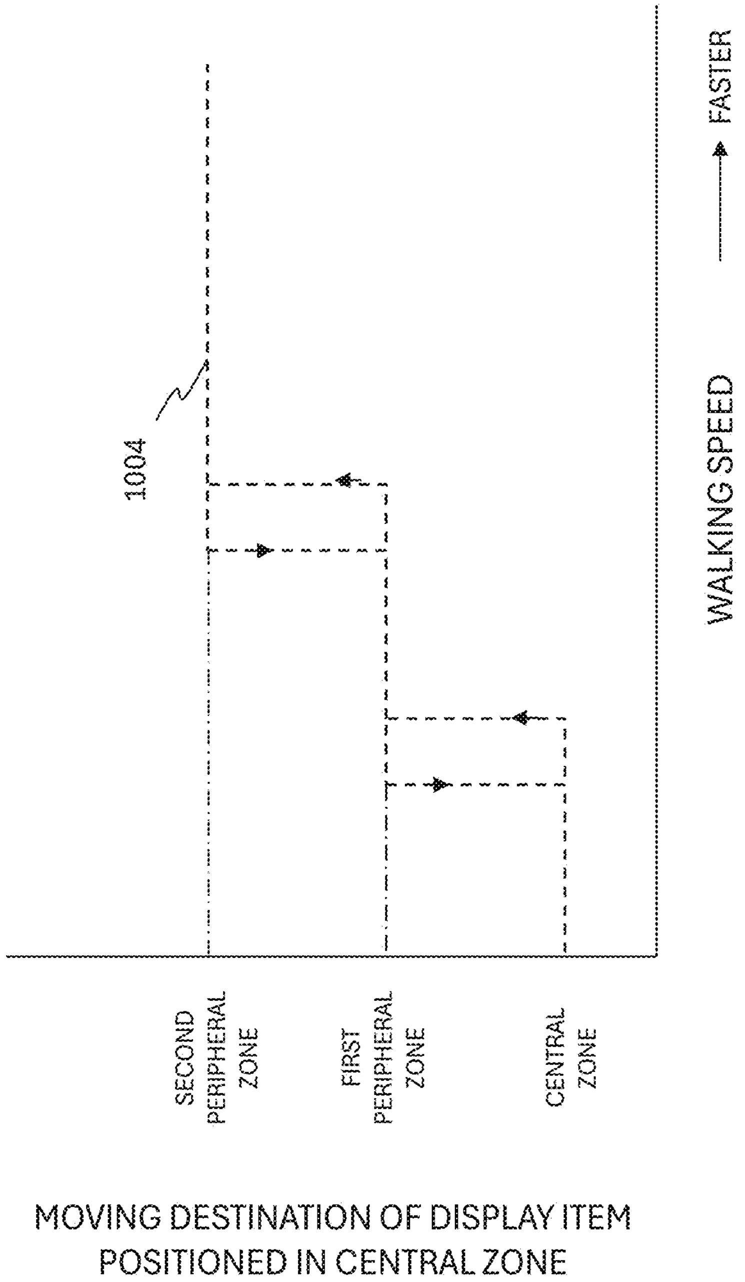
FIG. 9B is a diagram of the information processing device according to the embodiment described with reference to FIG. 1, which illustrates the relation between the walking speed and a moving destination of a display item positioned in a central zone.

With reference to FIG. 9A and FIG. 9B, the display item display operation of the information processing device for the case of controlling the enlargement display size of a display item positioned within a field of view display range depending on the walking speed of a user who is walking will be described. FIG. 9A illustrates the relation between the walking speed and the display size of a display item.

As the walking speed of the user 10 wearing the AR glasses 100 on the head increases, it becomes difficult for the user 10 to see and read a display item being shown as a virtual object within a field of view display range, and this may lead to the reduction in the visibility of the display item. For this case, enlarging the display item in the field of view display range more as the walking speed of the user 10 during walking increases and showing it enables the improvement in the visibility of the display item.

As illustrated using a solid line 1002 in FIG. 9A, it may be configured to increase the enlargement display size of the display item gradually depending on the walking speed of the user 10 during walking. In a further example, as illustrated using a broken line 1003 in FIG. 9A, it may be configured to switch the enlargement display size of the display item in multiple stages depending on the walking speed of the user 10 during walking. Switching the enlargement display size of the display item in multiple stages enables the user 10 to stably see the display item, since the display size of the display item does not change in response to slight change in the walking speed within a certain level range. In the case of switching the enlargement display size in multiple stages, the display is likely to be unstable due to the change in the display size, and thus, as illustrated using the broken line 1003, hysteresis is preferably provided to prevent the critical display size switching.

FIG. 9B illustrates the relation between the walking speed and a moving destination of a display item positioned in the central zone.

For example, for the case of normal walking in which the user is not walking so fast, as illustrated in FIG. 8C, it may be configured to move the display item positioned in the central zone 850 to the first peripheral zone 860, and for the case of fast walking in which the user is walking fast, as illustrated in FIG. 8D, it may be configured to move the display item positioned in the central zone 850 to the second peripheral zone 870. As the walking speed increases, the display item positioned in the central zone 850 comes closer within the field of view of the user so fast that the display item is like to obstruct the field of view in the forward scenery.

For this case, as illustrated in FIG. 9B, it may be configured to move the display item positioned in the central zone 850 to the first peripheral zone 860 and the second peripheral zone 870 which are located outer as the walking speed increases. This enables the reduction in the obstruction of the field of view in the forward scenery by the display item which is caused by the increase in the walking speed of the user 10. In the same manner as in FIG. 9A, in FIG. 9B as well, hysteresis may be provided to prevent the critical movement of the display item.

Furthermore, the display position of the display item may be switched in multiple stages depending on the walking speed of the user 10 during walking, that is, switched by subdividing the moving destination in detail more than the case where of moving the display item among the central zone 850, the first peripheral zone 860, and the second peripheral zone 870. Switching the display position of the display item in multiple stages enables the user 10 to stably see the display item since the display position of the display item does not change in response to slight change in the walking speed within a certain level range.

Furthermore, for the purpose of increasing a range for securing the field of view in the front of the moving direction when the user 10 is moving fast, such as when the user 10 switched walking to running, riding a bicycle, or the like, it may be configured to widen the central zone 850 within the field of view display range depending on the walking speed and the moving speed. The size of the central zone 850 may be controlled in the same manner as the case illustrated in FIG. 9A which illustrates the relation between the walking speed and the display size.

For example, where the central zone 850 when the user 10 walks at 4 km per hour is set as a trapezoidal area that opens about 10 degrees from the front of the shoulders of the user 10 to the left and right and extends forward for about 3 m, it may be configured to increase the forward distance of the trapezoidal area depending on the traveling speed, for example, extending it for about 5 m during running at 5 km per hour, while extending it for 10 m during riding a bicycle at 10 km per hour.

Eighth Embodiment

Figure 10:
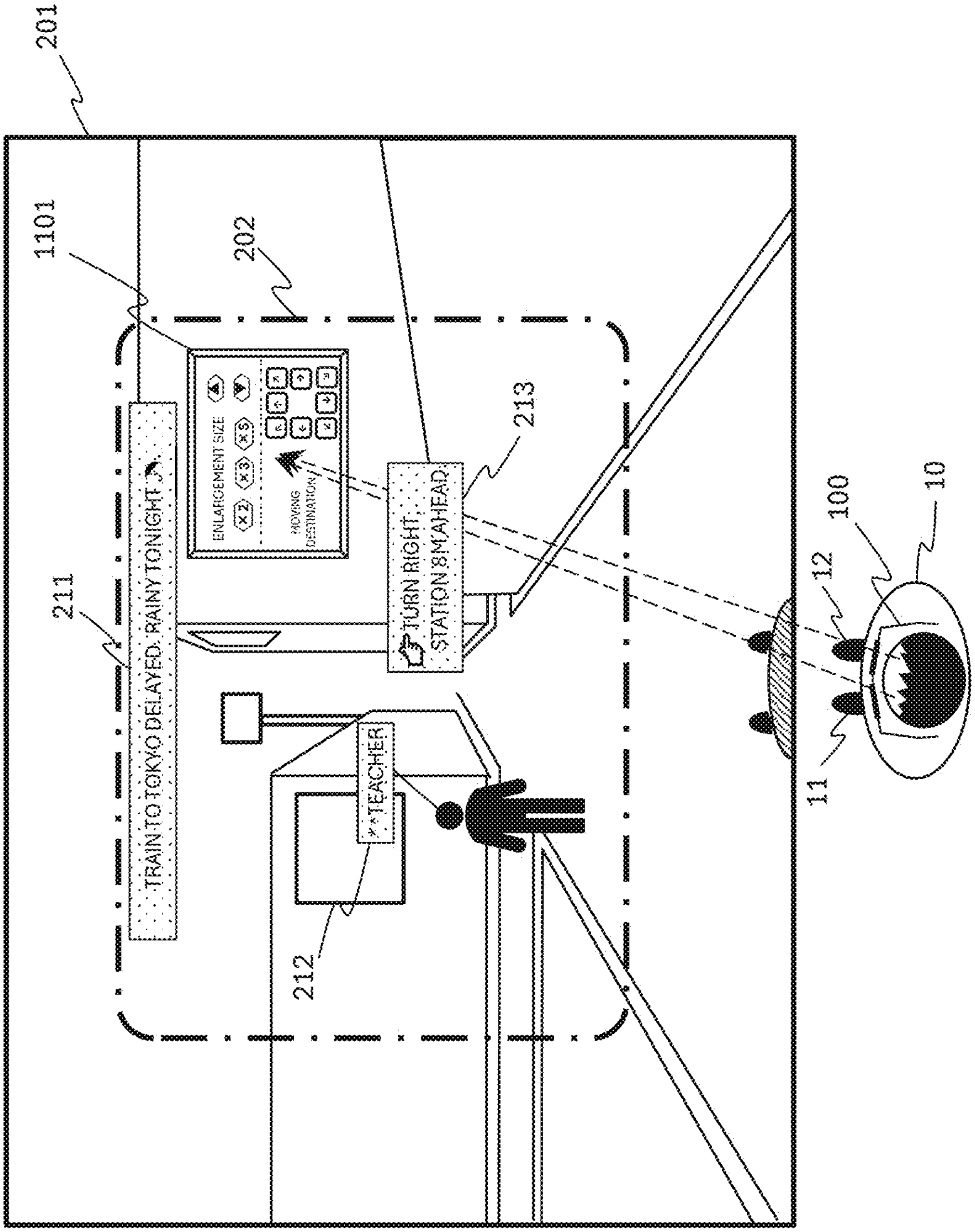
FIG. 10 is a diagram of the information processing device according to the embodiment described with reference to FIG. 1, which illustrates a case of displaying an operation menu in a stationary state.

With reference to FIG. 10, an input operation for the information processing device in the case of inputting and setting a display state, such as the display size and display position of a display item, for the walking of the user 10, will be described. FIG. 10 illustrates an example of displaying an operation menu 1101 within the field of view display range when the user is stationary. In FIG. 10, the portions illustrated in FIG. 2 and provided with the same reference signs function in the same manner as those described with reference to FIG. 2, and thus detailed explanation therefor will be partially omitted herein.

The user 10 may be a weak-sighted person or a person with a defect visual field, and for such a person having an impaired vision, it may be difficult to see the forward scenery or the display item during walking. For this case, as illustrated in FIG. 10, the AR glasses 100 may be configured to show, in the field of view display range 202, the operation menu 1101 for inputting and setting a display state such as the display size and display position of a display item. The user 10 can input and set a desired display size and desired display position of a display item using the operation menu 1101 upon start of walking, and this enables, during walking, the control of the display size and display position of the display item in accordance with the input setting information that he or she has input and set.

By performing an operation on the operation menu 1101 using the hand or lines of sight, the user 10 can input and set the display size and display position of a display item so as to optimize them. The input setting operation using the lines of sight is performed by detecting a line-of-sight destination of the user 10 using the left line-of-sight sensor 101 and the right line-of-sight sensor 102, and identifying the line-of-sight destination indicating a position of an input setting button on the operation menu 1101. Thus, the left line-of-sight sensor 101 and the right line-of-sight sensor 102 function as a line-of-sight input device for making the selection on the operation menu 1101.

Furthermore, a manual input setting operation performed by the hand which points to an input setting button position on the operation menu 1101 may be employed. For example, the user 10 having weak eyesight may enhance the visibility of the display item during walking if he or she inputs and sets the display size on the operation menu 1101 so as to enlarge the display item more than the standard size.

Furthermore, the operation menu 1101 may be used to input and set an optimum display position suitable for the eyesight of the user 10 as a display position of a display item to be moved from the central zone within the field of view display range 202 to the peripheral zone. Moving a display item during walking enables the forward scenery in the central zone to be opened, which improves the visibility of the forward scenery or that of the display item per se.

Still further, during walking, the input setting operation using lines of sight may be limited by hiding the operation menu 1101 for input setting using lines of sight, or by stopping the function of the input setting operation using lines of sight on the operation menu 1101. By limiting the input setting operation using lines of sight, the line of sight of the user 10 is not directed to the operation menu 1101, so that the user 10 can focus his or her lines of sight on the forward scenery or a display item as a virtual object within the field of view display range 202.

Still further, if performing an operation using the lines of sight for the operation menu 1101 during walking, the user 10 may be so distracted that he or she cannot pay attention to the walking destination, and thus, it may be configured to limit the display of the operation menu 1101, including an operation menu other than that for input setting, at a predetermined walking speed or more, for example, at 1 km per hour.

Processing Flow According to Each Embodiment

With reference to the flowcharts illustrated in FIG. 11A and FIG. 11B, a display operation for a display item at the start of walking and the stop of walking will be described.

Figure 11A:
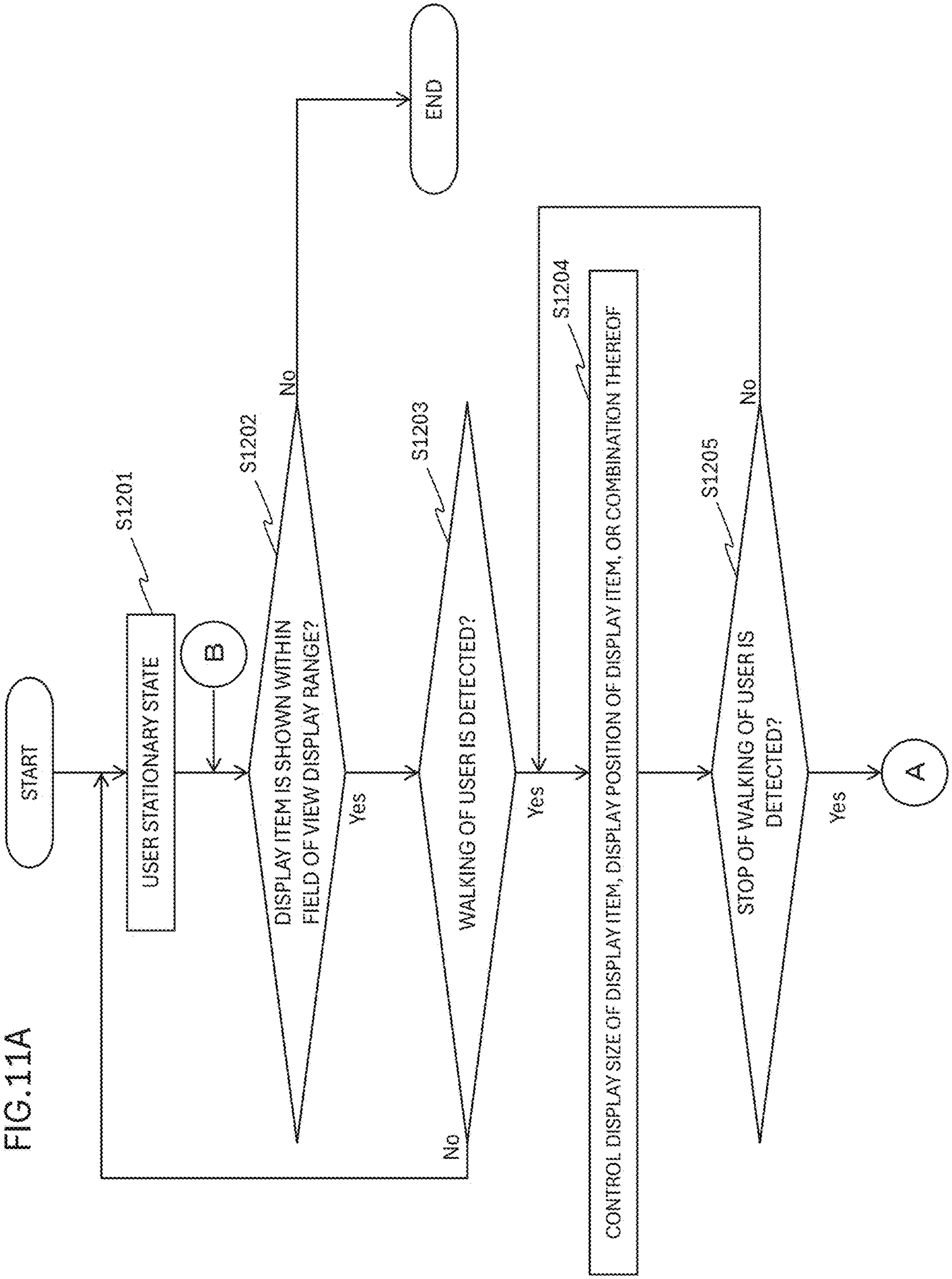
FIG. 11A illustrates a flowchart (first half) of an operation of an information processing device according to the present embodiment.

As illustrated in FIG. 11A, the user 10 wearing the AR glasses 100 is about to start walking. Before the user starts walking, in other words, while he or she is stationary (S1201), a display item is shown within a field of view display range (S1202: Yes). In this state, a processor 1320 determines whether the user is walking based on sensor information by a walking detection sensor (S1203: walking determination step).

When the processor 1320 determines that the user 10 is walking (S1203: Yes), in the AR glasses 100, the display size of the display item, the display position of the display item, or a combination thereof is controlled depending on the position of the display item being shown within the field of view display range (S1204). For example, the display item positioned in a peripheral zone within the field of view display range is enlarged and shown (corresponding to the enlargement step), or the display item positioned in a central zone of the field of view display range is moved to the peripheral zone (corresponding to the display position movement step) and shown (corresponding to the display step).

Thereafter, when the walking detection sensor detects the stop of walking (S1205: Yes), as illustrated in FIG. 11B, in the AR glasses 100, the state of the display size and display position of the display item as controlled is maintained as it is for the time being (S1206).

Here, if the user 10 performs an input operation indicative of shifting back the display state including the display size, the display position, or a combination thereof of the display item as maintained to the display state of the display item when the user 10 was stationary (S1207: Yes), the display state of the display item when the user 10 was stationary is restored (S1209).

Even in absence of the input operation indicative of restoration (S1207: No), when a predetermined control maintenance period of time passes after the stop of walking is detected (S1208: Yes), in the AR glasses 100, the display state of the display item as maintained is shifted back to the display state of the display item before being controlled, in other words, the display state of the display item when the user 10 was stationary (S1209).

Figure 11B:
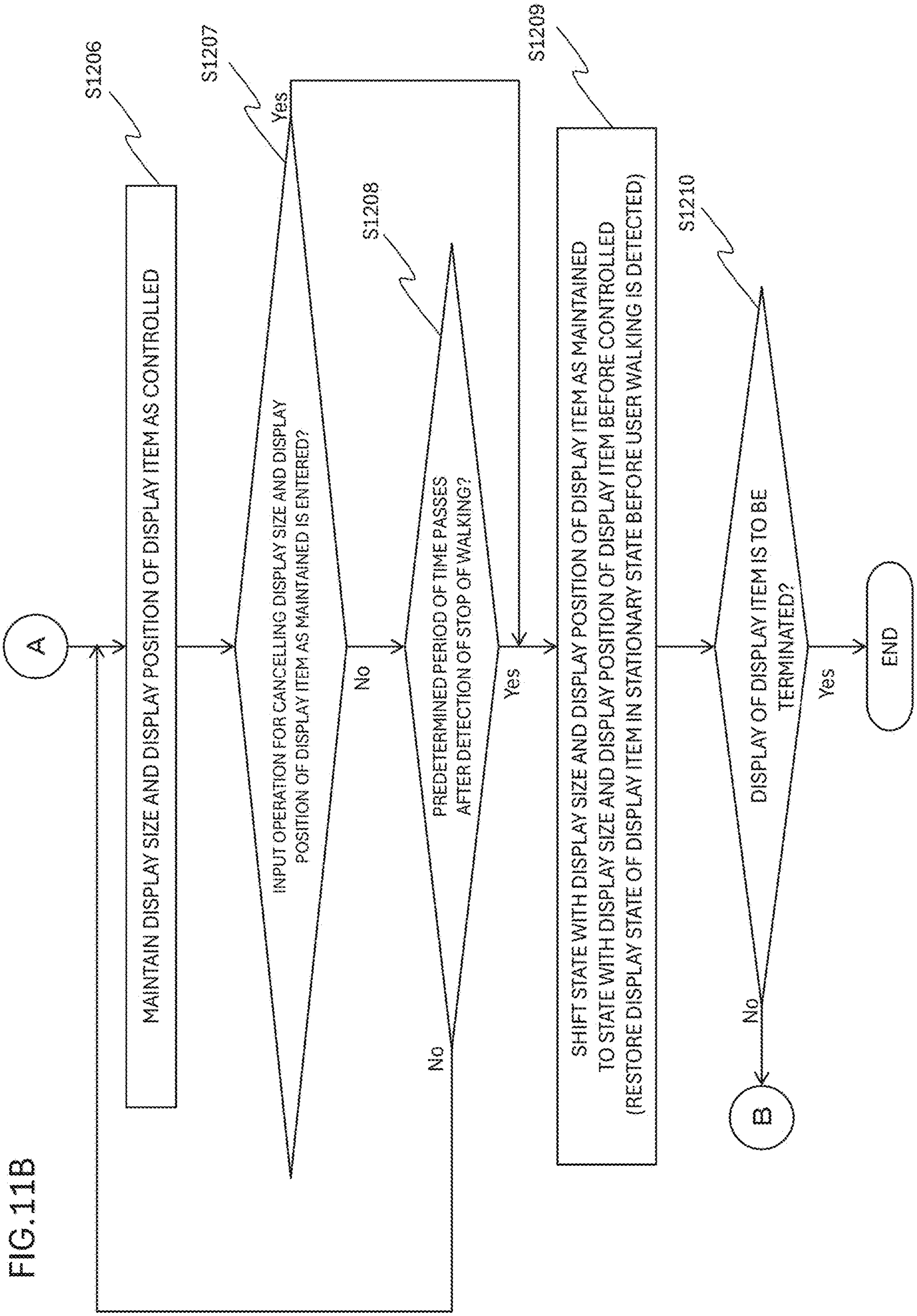
FIG. 11B illustrates a flowchart (second half) of an operation of an information processing device according to the present embodiment.

FIG. 11B illustrates that step S1207 is followed by step S1208 for the convenience of explanation, however, step S1207 and step S1208 may be executed in the reverse order. Alternatively, it may be configured that step S1207 and step S1208 are executed in parallel, and then the processing proceeds to step S1209 when a positive determination is made in either of step S1207 and step S1208.

After the display state of the display item when the user 10 was stationary is restored, if display of the display item for user walking is to be continued (S1210: No), the processing returns to S1202 of the sequence for checking whether the display item is being shown. If display of the display item is not to be continued (S1210: Yes), the sequence is terminated.

According to the operation described above, when a user stops walking, a display state of a display item while he or she was walking is maintained as it is for the time being, and after a predetermined control maintenance period of time passes or upon receiving an input operation made by the user, the display state of the display item while the user was walking as maintained is shifted back to the former display state of the display item when the user was stationary.

If a display state of a display item, including the display size, the display position, or a combination thereof, abruptly changes when the user stops walking, a user who has been seeing or reading the display item would be surprised or may feel uncomfortable, however, the display operation described above can suppress the occurrence of such a negative event.

It may be configured to shift back the display state of the display item gradually at a gentle pace to the former display state of the display item when the user was stationary, after a user operation is made or after a predetermine control maintenance period of time passes. This further enables the reduction in occurrence of an event that the user is surprised or feels uncomfortable.

Even while s user is walking, when he or she avoids puddles or walks on a rough road, a display state of a display item shown while the user walked on a normal road therebefore may be maintained as it is. In this case, suppression of the frequent changes in the display size and display position of the display item can prevent the user from feeling difficulties in seeing the display item.

Figure 12:
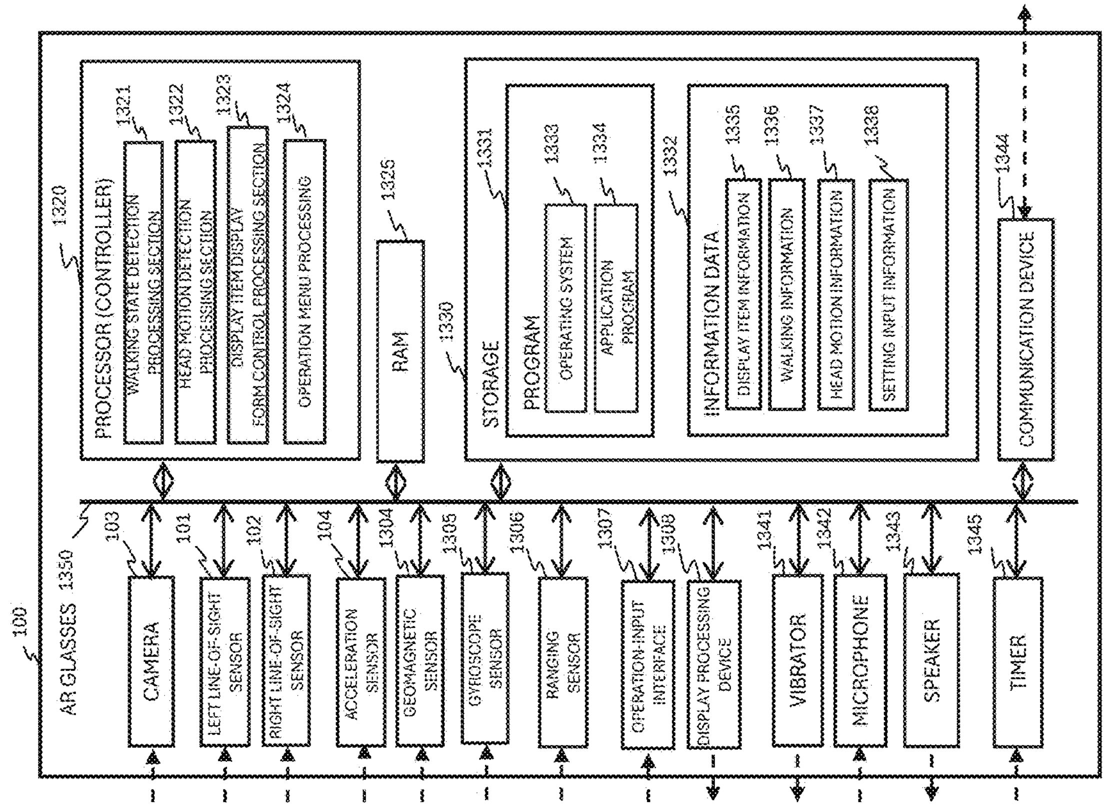
FIG. 12 is a block diagram of a configuration of AR glasses as an example of an information processing device according to the present embodiment.

A configuration example of the information processing device according to the present embodiment will be described with reference to FIG. 12. FIG. 12 is a block diagram of an example of a configuration of AR glasses as one aspect of an HMD which is an example of the information processing device according to the present embodiment. In FIG. 12, the portions illustrated in FIG. 1 and the like and provided with the same reference signs function in the same manner as those already described in FIG. 1 and the like, and thus a part of them will not be described in detail herein.

In FIG. 12, the pair of AR glasses 100 is configured appropriately with the left line-of-sight sensor 101, the right line-of-sight sensor 102, the camera 103, the acceleration sensor 104, a geomagnetic sensor 1304, a gyroscope sensor 1305, a ranging sensor 1306, an operation-input interface 1307, a display processing device 1308, the processor 1320, a storage 1330 for retaining programs 1331 and information data 1332, a vibrator 1341, a microphone 1342, a speaker 1343, a communication device 1344, a timer 1345, and a RAM 1325, and these components are connected to each other via a bus 1350.

The camera 103 captures an image of a field of view around the front of the camera, and converts light incident from a lens into an electric signal using an image sensor to acquire a camera capturing image.

The camera 103 captures an image of the foot of the user 10, together with the scenery in front of the user 10. The state of the foot of the user 10 as captured is used to analyze a walking state of the user 10, and thus the camera 10 is used as a walking detection sensor for detecting a walking action, a walking direction, and a walking speed of the user. Based on a captured image of the foot, not only a walking state of the user can be analyzed but also the state where the user is riding a bicycle, a kickboard, or the like with his or her feet moving can be found, which enables the display state control of enlarging a display item, or the like.

Furthermore, based on a captured image of the foot, the state where the user is on a train, a bus, or the like and thus his or her foot is not moving can be analyzed. In this case, even when the acceleration sensor 104 or the like detects the movement of the user 10, it is determined that the user is stationary, and thus the display state control for the display item would not be carried out.

If the camera 103 captures not only the foot but also the hand, it can be also determined whether the user is driving a car. It may be configured not to show a display item during driving.

In the case of using video see-through AR glasses, the camera 103 captures an image of a real object in the real space which is the scenery in front of the eyes, and the image of the real object as captured is shown on the display processing device 1308.

The left line-of-sight sensor 101 and the right line-of-sight sensor 102 are configured to detect the motions and directions of the left eye and the right eye, respectively, to capture the line-of-sight destination of the user 10. As the processing of detecting the motion of the eyeballs, the eye tracking processing which is a commonly used well-known technique may be used. For example, in the method using corneal reflection, the face is irradiated with an infrared LED (Light Emitting Diode) to capture an image of the face with an infrared camera, and a position of the reflected light on the cornea (corneal reflection) obtained by the irradiation of the infrared LED is used as a reference point, so that the motion of the eyeballs and the lines of sight are detected based on the positions of the pupils with respect to the position of the corneal reflection.

The acceleration sensor 104 is a sensor for detecting the acceleration which is the change in the speed per unit time to capture the motion, vibration, impact, and the like. The pair of AR glasses 100 is to be mounted on the head of the user 10, and analyzes and acquires the motion information about the rotation, tilting, and vibration of the head of the user 10 based on the acceleration data detected by the acceleration sensor 104 provided on the AR glasses 100.

The acceleration sensor 104 is used as a head motion detection sensor for detecting the motion of the head of the user, and detects a state of the user 10 turning the head to the left, right, up, down, or the like. However, the relative relation between the head and the body (direction of the foot) cannot be directly detected by the acceleration sensor worn on the head. For detecting the relative relation, an acceleration sensor may be worn on the body as well, or a camera built in the AR glasses 100 may be used to capture an image of the body or the foot.

Furthermore, when the user keeps walking in the same direction, the acceleration sensor 104 can be used as the walking detection sensor. In this case, the acceleration sensor 104 analyzes the sensor information by the head motion detection sensor to detect the motion of the head of the user, and also detects the walking direction and walking speed of the user wearing the AR glasses 100.

In the case of providing the acceleration sensor 104 only in the pair of AR glasses 100, the detection function thereof is limited to the detection of an average walking direction and that of the walking speed, which is, however, sufficient.

Furthermore, the gyroscope sensor 1305 is a sensor for detecting the angular velocity in the rotation direction, and captures the posture state in the vertical, horizontal, and oblique directions. The accuracy of detection may be increased if using a combination of the acceleration sensor 104 and the gyroscope sensor 1305 put in a smartphone placed in a pocket of the user, a smartwatch or the like.

The geomagnetic sensor 1304 is a sensor for detecting the magnetic force of the earth, and detects the orientation in which the pair of AR glasses 100 is facing. Using a three-axis geomagnetic sensor for detecting the geomagnetism in the up and down direction in addition to the front and rear direction and the left-right direction as the geomagnetic sensor 1304, the change in the geomagnetism relative to the motion of the AR glasses 100 can be captured, thereby detecting the motion of the AR glasses 100. This enables the analysis of the motion of the head of the user wearing the AR glasses 100 and the walking state of the user with more accuracy.

The ranging sensor 1306 is a sensor for measuring the distance to an object or the angle of the object, and captures the three-dimensional shape of the object. As the ranging sensor 1306, a LiDAR (Light Detection and Ranging) sensor configured to irradiate an object with a laser beam such as an infrared ray and measure the scattered light that is reflected back, so as to analyze and detect the distance to the object at a long distance and the state of the object is used. Alternatively, a TOF (Time Of Flight) sensor configured to measure the reflection time of a pulse light irradiated onto an object for each pixel so as to measure the distance, or a millimeter wave radar configured to emit a millimeter radio wave and capture the reflection wave thereof so as detect the distance to an object that has reflected the wave and the state of the object is used. The distance measurement sensor 1306 measures the distance to a real object in the forward scenery and the direction thereof, which allows, based on the measurement information, for example, a display item relating to the real object to be virtually placed in a space near the real object.

The processor 1320 is configured with a CPU, and the like.

The storage 1330 is configured with a nonvolatile storage device and the like, and retains various programs 1331 and information data 1332 to be processed by the processor 1320 and the like. As the information data 1332, display item information 1335, walking information 1336, head motion information 1337, input setting information 1338, and the like are stored.

The processor 1320 loads an operating system (OS) 1333 and an application program 1334 such as an operation control program stored in the storage 1330 into the RAM 1325 and executes them, whereby a walking state detection processing section 1321, a head motion detection processing section 1322, a display item display form control processing section 1323, and an operation menu processing section 1324 are configured, so that the functions such as an OS, middleware, and applications, and other functions are implemented.

In the case of the optical see-through AR glasses, the display processing device 1308 includes a projection device for projecting a display item, notification information for a user, and the like, and a transparent half-mirror for forming and displaying an image of the projected display item and the like in front of the eyes.

This allows the user 10 to see the image of the display item together with a real object included in the field of view in front of the eyes, as if the display item was floating.

In the case of the video see-through AR glasses, a display such as a liquid crystal panel is provided, and the display is configured to display an image of a real object in front of the eyes which has been captured by the camera 103, together with an image of a display item or the like.

This allows the user 10 to see the real object in the field of view image in front of the eyes and the display item which is superimposed thereon.

The operation input interface 1307 is, for example, an input means using the line of sight, the hand, a pointer, a keyboard, a key button, a touch key, or the like, and allowing the user 10 to enter and set the information that he or she wishes to input.

The input operation information may be captured based on a position to which the line of sight is directed on an input operation screen, such as the operation menu 1101, that has been shown on the display screen of the display processing device 1308, or based on an operation by the hand or a pointer, which has been shown on the input operation screen, made on the operation input interface 1307.

In the case where the operation input interface 1307 is a keyboard, a key button, a touch key, or the like, it may be provided on any position or in any form on the AR glasses 100 so that the user 10 can easily perform an input operation. Alternatively, the operation input interface 1307 may be separated from the main body of the AR glasses 100 and connected by wire or wirelessly.

Alternatively, the operation input interface 1307 may be configured to collect the voice of the user 10 which indicates an input operation using the microphone 1342 so as to capture the input operation information.

The microphone 1342 collects an external sound or the voice of the user himself or herself, and converts it into the audio data including digital data using an A/D converter (not illustrated). Using the microphone 1342, the AR glasses 100 can capture the instruction information based on the voice of the user 10 and executes an operation based on the instruction information in a convenient manner.

The speaker 1343 is configured to output the sounds based on the audio data, and notify the user 10 of the notification information by means of the sounds. For example, the speaker 1343 outputs the direction in which the user 10 is traveling, the direction to which the head of the user is directed, the information about enlargement display and position movement of a display item, and the like, by means of the sounds.

The vibrator 1341 is configured to generate the vibration in accordance with the control of the processor 1320, and converts the notification instruction information from the AR glasses 100 to the user 10 into the vibration. Using the vibrator 1341, the AR glasses 100 can inform the user wearing the AR glasses 100 of the notification instruction information by means of the vibration transmitted to the head of the user, which enables the improvement in the usability.

The communication device 1344 is a communication interface for wireless communication with other devices by short-range wireless communication such as Bluetooth (registered trademark) and ZigBee (registered trademark). The communication device 1344 includes communication processing circuitry, an antenna, and the like for various predetermined communication interfaces, and transmits and receives various kinds of information, control signals, and the like. The communication device 1344 may include a telephone communication network.

The timer 1345 is used for measurement of time, and measures the elapse of a predetermined control maintenance period after the detection of the stop of walking.

The walking state detection processing section 1321 is configured to analyze the walking state of the user 10 based on an image of the foot captured by the camera 103, and detect the walking direction and the walking speed. Furthermore, the walking state detection processing section 1321 analyzes the walking state of the user 10 based on the motion information about the head detected by the acceleration sensor 104, and detects the walking direction and the walking speed. As the walking state detection processing section 1321, in addition to the acceleration sensor 104, the geomagnetic sensor 1304 and the gyroscope sensor 1305 may be used as well.

The head motion detection processing section 1322 is configured to detect the motion of the head of the user 10 using the acceleration sensor 104, and analyze and acquire the state of the user 10 turning the head to the left, right, up, down, or the like. As the head motion detection processing section 1322, in addition to the acceleration sensor 104, the geomagnetic sensor 1304 and the gyroscope sensor 1305 may be used as well.

The display item display form control processing section 1323 is configured to control the display size of a display item, the display position of the display item, or a combination thereof depending on the position of the display item being shown in the field of view display ranges 202, 602, 604, 701, 702 as the virtual object. The display item display form control processing section 1323 enlarges and displays, for example, the display item positioned in the peripheral zones 660, 760, 761, 860, 870 within the field of view display range, or move the display item positioned in the central zones 650, 750, 751, 850 within the field of view display range to the peripheral zones 660, 760, 761, 860, 870 and enlarge and display it.

The operation menu processing section 1324 is configured to display the operation menu 1101 for setting and inputting a display state including the display size and display position of a display item, an operation instruction for the AR glasses 100, and the like. The operation menu processing section 1324 sets and inputs the information that the user 10 has entered on the displayed operation menu 1101 using the line of sight, hand, or the like.

With the configuration described above, in the AR glasses 100, when the walking state detection processing section 1321 detects that the user 10 is walking, the display item display form control processing section 1323 enlarges and displays a display item generated and displayed within a field of view display range of the user, or enlarges and displays a display item positioned in the peripheral zones 660, 760, 761, 860, 870 within the field of view display ranges 202, 602, 604, 701, 702, or enlarges and displays the display item positioned in the peripheral zones 660, 760, 761, 860, 870 within the field of view display ranges 202, 602, 604, 701, 702 to be larger than that positioned in the central zones 650, 750, 751, 850.

Furthermore, in the AR glasses 100, when the walking state detection processing section 1321 detects that the user 10 is walking, if the head motion detection processing section 1322 detects the motion of the head of the user, the display item display form control processing section 1323 may maintain the state including the display size and display position of the display item before the motion of the head occurs, and show the display item in the display state as maintained.

Furthermore, in the AR glasses 100, when the walking state detection processing section 1321 detects that the user 10 is walking, the display item display form control processing section 1323 may move a display item positioned in the central zones 650, 750, 751, 850 within the field of view display range to the peripheral zones located outside of the central zones 650, 750, 850 within the field of view display range, and enlarge and display it.

In the case of dividing the field of view display range 202 into the first peripheral zone 860, which is adjacent to the outside of the central zone 850 and serves as a peripheral portion, and the second peripheral zone 870, which is adjacent to the outside of the first peripheral zone 860 and serves as a peripheral portion, the display item display form control processing section 1323 may move the display item positioned in the central zone 850 to the first peripheral zone 860 and slightly enlarge and show the display item or show the display item in the same size without enlarging it, or move the display item positioned in the central zone 850 to the second peripheral zone 870 and greatly enlarge and show the display item. Furthermore, the display item display form control processing section 1323 may move the display item positioned in the central zone 850 to the outside of the field of view display range 202.

Furthermore, the AR glasses 100 may be configured that the walking state detection processing section 1321 detects the walking speed of the user 10 who is walking, and the display item display form control processing section 1323 controls the display size or display position of a display item, or a combination thereof depending on the detected walking speed of the user 10. In this case, the display size or display position of a display item, or a combination thereof may be switched and controlled in multiple stages depending on the walking speed of the user.

The AR glasses 100 may be configured that the operation menu processing section 1324 sets and inputs the information that the user 10 has entered by means of an operation using such as his or her line of sight or hand performed on the displayed operation menu 1101, and the display item display form control processing section 1323 controls the display size and display position of the display item in accordance with the input setting information.

The AR glasses 100 may be configured to stop the operation menu processing section 1324 so as to disable an input operation to be performed on the operation menu using the line of sight of the user when the walking state detection processing section 1321 detects that the user 10 is walking.

Additionally, the AR glasses 100 may be configured that, when the walking state detection processing section 1321 detects that the user 10 stops walking, the display item display form control processing section 1323 maintains the display size and display position of the display item as it is, and then shifts the maintained display size and display position of the display item while the user was walking to the former display size and display position of the display item when the user was stationary after a predetermined control maintenance period of time passes or upon receiving an input operation made by the user.

Thus, it is possible to realize an information processing device and an information processing method, which enables a user who is walking to easily view a display item positioned within a field of view display range as a virtual object together with the forward scenery, while preventing the line of sight from concentrating on a field of view peripheral area, with considering the safety in the front of the walking direction and around the foot.

Nineth Embodiment

Figure 13A:
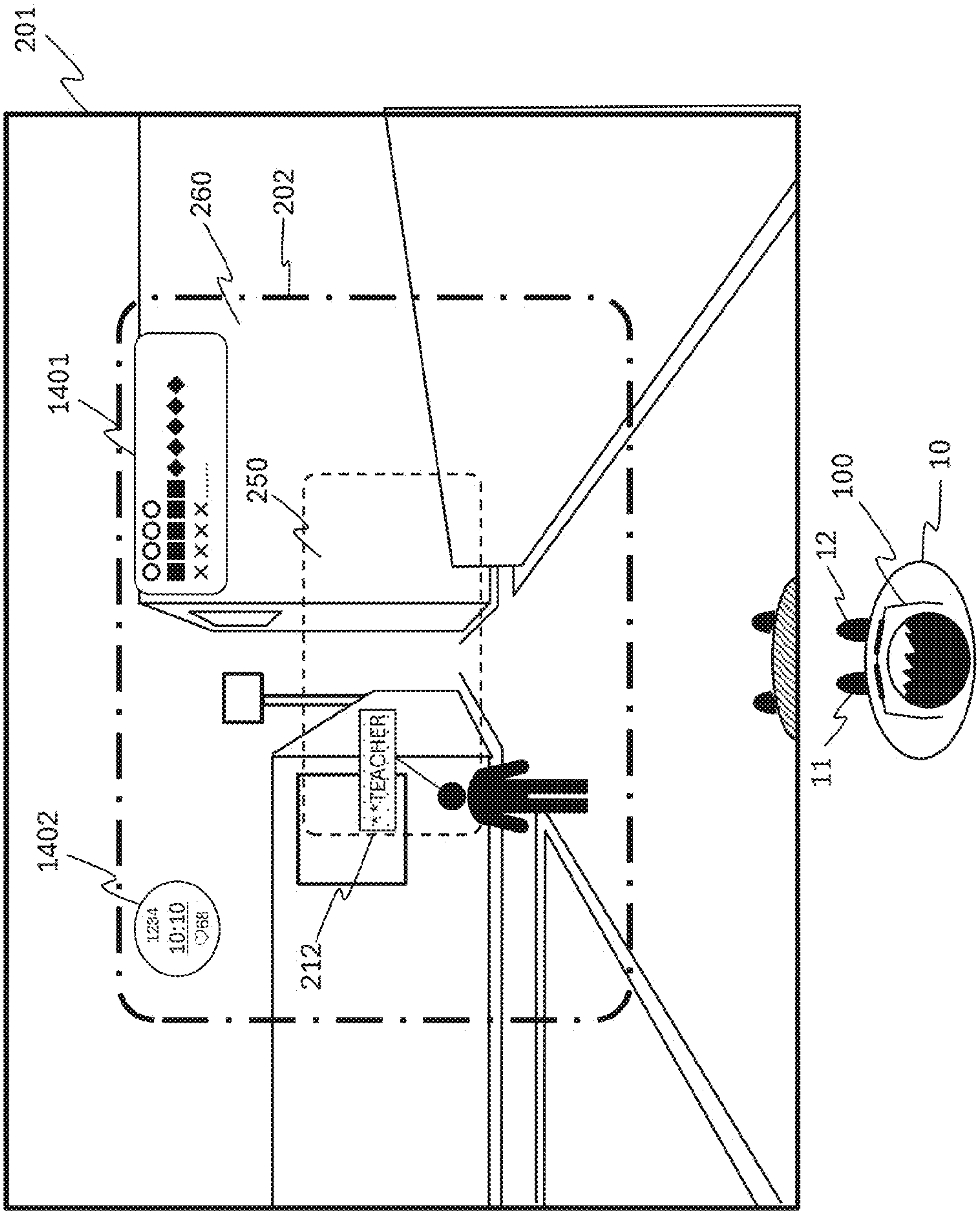
FIG. 13A is a diagram of the information processing device according to the embodiment described with reference to FIG. 1, which illustrates a case of displaying a screen of a smartphone and that of a smartwatch as display items, in a user stationary state.
Figure 13B:
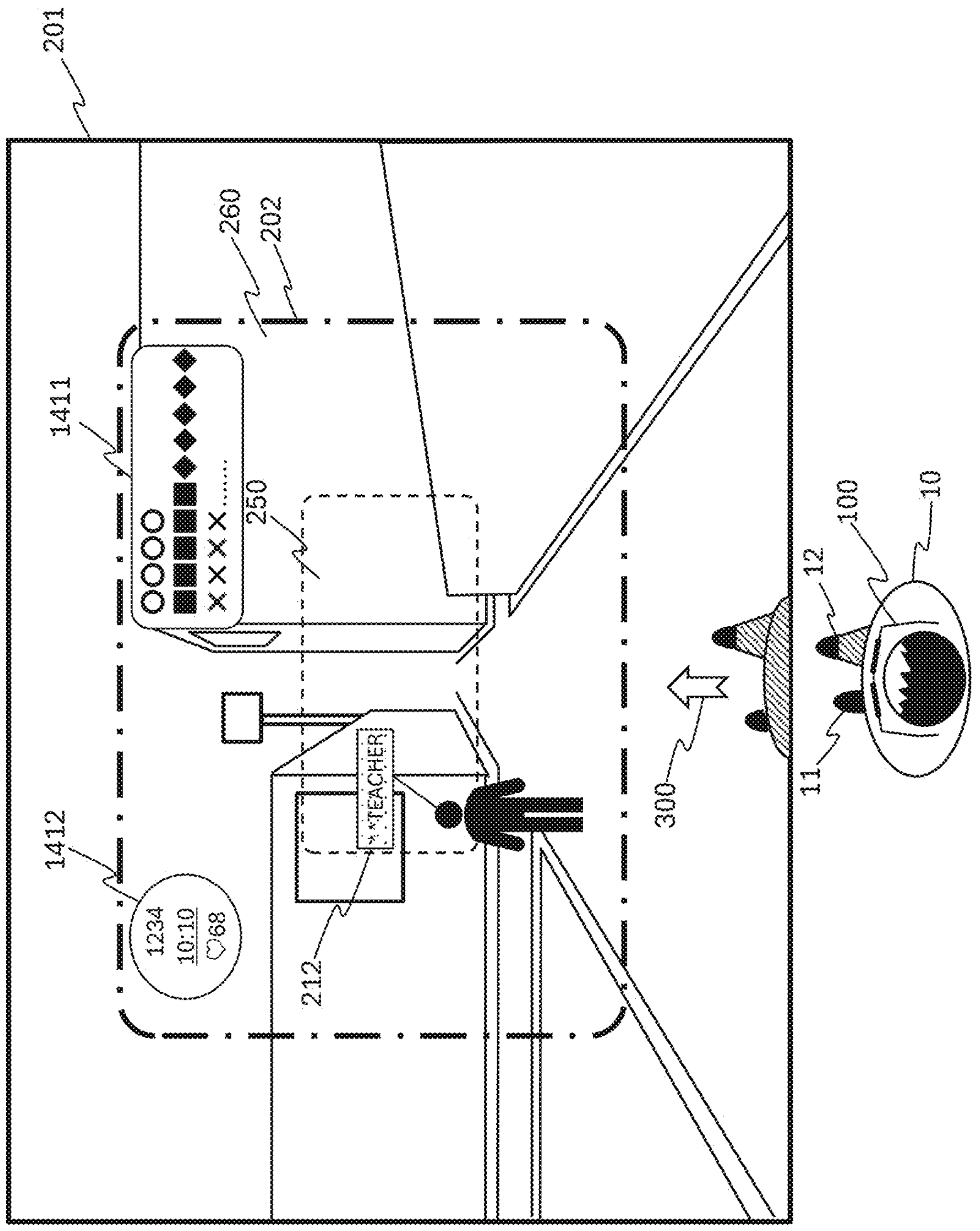
FIG. 13B is a diagram of the information processing device according to the embodiment described with reference to FIG. 1, which illustrates a case of displaying a screen of a smartphone and that of a smartwatch as display items, in a user walking state.

It may be configured to show, as a display item, a screen transmitted from a smartphone or a smartwatch on the AR glasses 100. For example, as illustrated in FIG. 13A, in the case where a smartphone screen 1401 and a smartwatch screen 1402 are being shown as display items in the peripheral zone 260 within the field of view display range 202 while the user is stationary, they are enlarged and shown in the field of view display range 202 as a smartphone screen 1411 and a smartwatch screen 1412, respectively, while the user is walking, as illustrated in FIG. 13B. In FIG. 13A and FIG. 13B, the portions illustrated in FIG. 2 and FIG. 4 and provided with the same reference signs function in the same manner as those described above, and thus detailed explanation therefor will be partially omitted herein.

This allows the user 10 to easily see the smartphone screen and the smartwatch screen being displayed as the virtual objects in the peripheral zone where his or her lines of sight of the user are unlikely to reach during walking.

It may be configured to enlarge a screen transmitted from a smartphone or a smartwatch and display it on the AR glasses 100. Alternatively, it may be configured to, upon detecting that the user 10 starts walking, request the smartphone or smartwatch to transmit the enlarged screen, and after receiving the enlarged screen, display it on the AR glasses 100.

In the latter case, the smartphone or smartwatch needs to include the function of receiving an instruction for an enlarged screen and transmitting the enlarged screen, and preferably authenticated in advance that the pair of AR glasses 100 includes the same function.

In the case of the optical see-through AR glasses, it may be configured to make the text provided in the display item bold to increase the brightness in bright places while making it thin to reduce the glare in dark places.

In the above, the pair of AR glasses 100 which is one form of an HMD has been described as a specific example of the information processing device, however, it is needless to say that the present invention is directed to all devices having the same functions, and the same operations and effects can be obtained in any information device as long as it is configured to show a display item as a virtual object in a field of view display area of a user to allow the user to see it together with the forward scenery.

The present invention is not limited to the embodiments described above, and various modifications can be made for the present invention. For example, the embodiments described above have been explained in detail for the purpose of making it to understand the present invention easily, and thus are not necessarily limited to those having all the configurations as described. Furthermore, a part of the configuration of an embodiment may be replaced with the configuration of a further embodiment, and the configuration of an embodiment may include the configuration of a further embodiment, which are all included in the scope of the present invention. The numerical values and messages appearing in the text and drawings are merely examples, and accordingly, the advantageous effects of the present invention are not impaired even if different ones are used.

The numerical values and messages appearing in the text and drawings are merely examples, and thus the advantageous effects of the present invention would not be impaired even if different ones are used.

Still further, some or all the configurations, functions, processing sections, processing means, and the like of the present invention may be implemented in hardware, for example, by designing them with integrated circuitry, a general-purpose processor, or a specific-purpose processor. A processor includes transistors, circuitry, and others, and is considered as circuitry or processing circuitry. Each of the components, functions, and the like described above may be implemented in software by having the processor interpret and execute a program for implementing each function. The programs, tables, files, and the like for implementing each function may be stored in the memory, recording devices such as hard disks and SSDs (Solid State Drives), or recording media such as IC cards, SD cards, and DVDs, or they may be stored in devices on a communication network. The control lines and information lines which are considered to be necessary for the purpose of explanation are indicated herein, but not all the control lines and information lines of actual products are necessarily indicated. It may be considered that almost all the components are actually connected to each other.

The embodiments described above include the following aspects.

(1) An information processing device worn on the head of a user and having a function of generating and displaying a display item such as text, icons, and the like as a virtual object while allowing the user to see a field of view in the front includes a walking detection sensor configured to detect a walking state including a walking action, a walking direction, a walking speed of the user, and the like, and the information processing device is configured to enlarge the display item as generated and shown in a field of view display range of the user when the walking detection sensor detects that the user is walking.

(2) The information processing device according to (1), wherein, when the walking detection sensor detects that the user is walking, the information processing device enlarges and displays the display item positioned in a peripheral zone within the field of view display range.

(3) The information processing device according to (2), wherein, when the walking detection sensor detects that the user is walking, the information processing device enlarges the display item positioned in the peripheral zone within the field of view display range to be larger than the display item that is positioned in the central zone within the field of view display range with being enlarged.

(4) The information processing device according to (2), wherein the information processing device includes a head motion detection sensor configured to detect a motion of the head of the user wearing the information processing device, and when the walking detection sensor detects that the user is walking and if the head motion detection sensor detects the motion of the head of the user, the information processing device maintains a display state such as the display size of the display item before the motion of the head is detected, and displays the display item in the maintained display state.

(5) The information processing device according to (2), wherein the information processing device detects a walking speed of the user using the walking detection sensor, and controls the display size of the display item to be enlarged and displayed depending on the walking speed of the user detected by the walking detection sensor.

(6) The information processing device according to (5), wherein the information processing device switches and controls the display size of the display item to be enlarged in multiple-stage and displayed depending on the walking speed of the user detected by the walking detection sensor.

(7) The information processing device according to (2), wherein the information processing device includes an operation menu for setting and inputting a display state including the display size and display position of the display item when the user walks, and the information processing device controls the display size of the display item when the user walks depending on the setting input information that has been set and input on the operation menu.

(8) The information processing device according to (1), wherein the information processing device includes an operation menu and a line-of-sight input device for selecting an item on the operation menu, and the information processing device limits an input operation using a line-of-sight of the user on the operation menu when the walking detection sensor detects that the user is walking.

(9) The information processing device according to (1), wherein the information processing device maintains the display size of the display item while the user was walking even when the walking detection sensor detects that the user stops walking, and shifts the maintained display size of the display item while the user was walking to the former display size of the display item when the user was stationary after a predetermined control maintenance period of time passes since the user stopped walking or in response to an input operation made by the user.

(10) An information processing device worn on the head of a user and having a function of generating and displaying a display item such as text, icons, and the like as a virtual object while allowing the user to see a field of view in the front includes a walking detection sensor configured to detect a walking state including a walking action, a walking direction, a walking speed of the user, and the like, and the information processing device is configured to move the display item positioned in a central zone within a field of view display range to the outside of the central zone within the field of view display range when the walking detection sensor detects that the user is walking.

(11) The information processing device according to (10), wherein the information processing device moves the display item positioned in the central zone within the field of view display range during walking to a peripheral zone within the field of view display range, and enlarges and displays it.

(12) The information processing device according to (11), wherein in the case of dividing the peripheral zone within the field of view display range into a first peripheral zone, which is adjacent to the outside of the central zone within the field of view display range and serves as a peripheral portion, and a second peripheral zone, which is adjacent to the outside of the first peripheral zone and serves as a peripheral portion, the information processing device enlarges the display item moved to the second peripheral zone when the walking detection sensor detected that the user was walking to be larger than the display item moved to the first peripheral zone.

(13) The information processing device according to (10), wherein the information processing device detects a walking speed of the user using the walking detection sensor, and controls the display position of the display item to be enlarged and displayed depending on the walking speed of the user detected by the walking detection sensor.

(14) The information processing device according to (13), wherein the information processing device switches in multiple-stage and controls the display position of the display item depending on the walking speed of the user detected by the walking detection sensor.

(15) The information processing device according to (10), wherein the information processing device includes an operation menu for setting and inputting a display state including the display size and display position of the display item when the user walks, and the information processing device controls the display position of the display item when the user walks depending on the setting input information that has been set and input on the operation menu.

(16) The information processing device according to (10), wherein the information processing device includes an operation menu and a line-of-sight input device for selecting an item on the operation menu, and the information processing device limits an input operation using a line-of-sight of the user on the operation menu when the walking detection sensor detects that the user is walking.

(17) The information processing device according to (10), wherein the information processing device maintains the display position of the display item while the user was walking even when the walking detection sensor detects that the user stops walking, and shifts the maintained display position of the display item while the user was walking to the former display position of the display item when the user was stationary after a predetermined control maintenance period of time passes since the user stopped walking or in response to an input operation made by the user.

(18) An information processing method in an information processing device worn on the head of a user, the information processing device having a function of generating and displaying a display item such as text, icons, and the like as a virtual object while allowing the user to see a field of view in the front, and including a walking detection sensor configured to detect a walking state including a walking action, a walking direction, a walking speed of the user, and the like, wherein the information processing method includes the steps of:

detecting whether the user is walking using the walking detection sensor; and enlarging and displaying the display item generated and displayed within a field of view display range or moving the display item to the outside of a central zone within the field of view display range when the walking detection sensor detects that the user is walking.

(19) The information processing method according to (18), wherein the information processing method includes the step of enlarging and displaying the display item positioned in a peripheral zone within the field of view display range when the walking detection sensor detects that the user is walking.

(20) An information processing device worn on a user, comprising: a display processing device configured to display an augmented reality object within a field of view display range; a walking detection sensor configured to detect a walking state of the user; and a processor, the processor being configured to execute control of: determining whether the user is walking based on sensor information by the walking detection sensor, and upon determining that the user is walking, enlarging the augmented reality object; and displaying the augmented reality object as enlarged within the field of view display range.

(21) An information processing device to be worn on a user, comprising: a display processing device configured to display an augmented reality object within a field of view display range; a walking detection sensor configured to detect a walking state of the user; and a processor, the field of view display range having a central zone including a center point of the field of view display range and a peripheral zone located at an outer edge of the central zone, and the processor being configured to execute display control of: determining whether the user is walking based on sensor information by the walking detection sensor, and upon determining that the user is walking, moving the augmented reality object being displayed in the central zone to the peripheral zone.

(22) An information processing method to be executed by an information processing device to be worn on a user, comprising: a walking determination step of determining whether the user is walking based on sensor information by a walking detection sensor configured to detect a walking state of the user; an enlargement step of enlarging an augmented reality object to be larger than that in a state where the user is stationary upon determining that the user is walking; and a display step of causing a display processing device to display the augmented reality object as enlarged.

REFERENCE SIGNS LIST

10: user
11: foot
12: foot
100: AR glasses
101: left line-of-sight sensor
102: right line-of-sight sensor
103: camera
104: acceleration sensor
111: display item
112: display item
113: display item
201: forward scenery
202: field of view display range
211: display item
212: display item
213: display item
250: central zone
260: peripheral zone
300: arrow
311: display item
312: display item
313: display item
511: display item
512: display item
601: arrow
602: field of view display range
603: arrow
604: field of view display range
612: display item
613: display item
650: central zone
651: central zone
660: peripheral zone
661: peripheral zone
701: field of view display range
702: field of view display range
713: display item
750: central zone
751: central zone
760: peripheral zone

761: peripheral zone
801: dashed-line frame
802: dashed-line frame
812: display item
813: display item
822: display item
823: display item
832: display item
850: central zone
860: first peripheral zone
870: second peripheral zone
1002: solid line
1003: broken line
1101: operation menu
1304: geomagnetic sensor
1305: gyroscope sensor
1306: ranging sensor
1307: operation-input interface
1308: display processing device
1320: processor
1321: walking state detection processing section
1322: head motion detection processing section
1323: display item display form control processing section
1324: operation menu processing section
1325: RAM
1330: storage
1331: program
1332: information data
1334: application program
1335: display item information
1336: walking information
1337: head motion information
1338: input setting information
1341: vibrator
1342: microphone
1343: speaker
1344: communication device
1345: timer
1350: bus
1401: smartphone screen
1402: smartwatch screen
1411: smartphone screen
1412: smartwatch screen

The invention claimed is:

1. An information processing device to be worn on a user, comprising:

a display processing device configured to display an augmented reality object within a field of view display range;

a walking detection sensor configured to detect a walking state of the user; and a processor, the processor being configured to execute control of:

determining whether the user is walking based on sensor information by the walking detection sensor, and upon determining that the user is walking, enlarging a text or an icon included in the augmented reality object; and displaying the augmented reality object including the enlarged text or the enlarged icon within the field of view display range, wherein the field of view display range has a central zone including a center point of the field of view display range and a peripheral zone located at an outer edge of the central zone, wherein the peripheral zone within the field of view display range is divided into a first peripheral zone adjacent at an outside of the central zone and a second peripheral zone adjacent at an outside of the first peripheral zone, and wherein the processor determines that the user is walking based on the sensor information by the walking detection sensor, and set an enlargement ratio of the text or the icon included in the augmented reality object moved to the second peripheral zone more than an enlargement ratio of the text or the icon included in the augmented reality object moved to the first peripheral zone.

2. The information processing device according to claim 1, wherein the processor enlarges the text or the icon included in the augmented reality object being displayed in the peripheral zone but does not enlarge the text or the icon included in the augmented reality object being displayed in the central zone.

3. The information processing device according to claim 2, wherein the processor enlarges the text or the icon included in the augmented reality object being displayed in the peripheral zone to be larger than the text or the icon included in the augmented reality object being displayed in the central zone.

4. The information processing device according to claim 2, further comprising a head motion detection sensor configured to detect a motion of a head of the user wearing the information processing device, wherein upon detecting the motion of the head of the user based on sensor information by the head motion detection sensor when determining that the user is stationary based on the sensor information by the walking detection sensor, the processor moves a position of the field of view display range following the motion of the head, and enlarges the text or the icon included in the augmented reality object being displayed in the peripheral zone within the field of view display range after moving but does not enlarge the text or the icon included in the augmented reality object being displayed in the central zone within the field of view display range after moving.

5. The information processing device according to claim 4, wherein upon detecting the motion of the head of the user based on the sensor information by the head motion detection sensor when determining that the user is walking based on the sensor information by the walking detection sensor, the processor does not change the display size of the text or the icon included in the augmented reality object before and after detecting the motion of the head.

6. The information processing device according to claim 4, wherein the walking detection sensor is at least one of a camera for capturing an image of a foot of the user, an acceleration sensor, a geomagnetic sensor, or a gyroscope sensor, and the head motion detection sensor is at least one of the acceleration sensor, the geomagnetic sensor, or the gyroscope sensor.

7. The information processing device according to claim 2, wherein the processor detects a walking speed of the user based on the sensor information by the walking detection sensor, and controls a display size depending on the walking speed when enlarging the text or the icon included in the augmented reality object.

8. The information processing device according to claim 1, wherein the processor displays and controls, within the field of view display range, an operation menu for setting and inputting a display size of the text or the icon included in the augmented reality object.

9. An information processing device to be worn on a user, comprising:

a display processing device configured to display an augmented reality object within a field of view display range;

a walking detection sensor configured to detect a walking state of the user; and a processor, the field of view display range having a central zone including a center point of the field of view display range and a peripheral zone located at an outer edge of the central zone, and the processor being configured to execute display control of:

determining whether the user is walking based on sensor information by the walking detection sensor, and upon determining that the user is walking, enlarging a text or an icon included in the augmented reality object being displayed in the central zone and moving the augmented reality object including the enlarged text or the enlarged icon to the peripheral zone, wherein the peripheral zone within the field of view display range is divided into a first peripheral zone adjacent at an outside of the central zone and a second peripheral zone adjacent at an outside of the first peripheral zone, and wherein the processor determines that the user is walking based on the sensor information by the walking detection sensor, and set an enlargement ratio of the text or the icon included in the augmented reality object moved to the second peripheral zone more than an enlargement ratio of the text or the icon included in the augmented reality object moved to the first peripheral zone.

10. The information processing device according to claim 9, wherein the processor detects a walking speed of the user based on the sensor information by the walking detection sensor, and controls a display position of the augmented reality object depending on the walking speed.

11. The information processing device according to claim 9, wherein the processor displays and controls, within the field of view display range, an operation menu for setting and inputting a display size of the text or the icon included in the augmented reality object.

12. An information processing method to be executed by an information processing device to be worn on a user, comprising:

a walking determination step of determining whether the user is walking based on sensor information by a walking detection sensor configured to detect a walking state of the user;

an enlargement step of enlarging, within a field of view display range on the display processing device, a text or an icon included in an augmented reality object to be larger than that in a state where the user is stationary upon determining that the user is walking; and a display step of causing a display processing device to display the augmented reality object including the enlarged text or the enlarged icon, wherein the field of view display range has a central zone including a center point of the field of view display range and a peripheral zone located at an outer edge of the central zone, wherein the peripheral zone within the field of view display range is divided into a first peripheral zone adjacent at an outside of the central zone and a second peripheral zone adjacent at an outside of the first peripheral zone, and wherein the processor determines that the user is walking based on the sensor information by the walking detection sensor, and set an enlargement ratio of the text or the icon included in the augmented reality object moved to the second peripheral zone more than an enlargement ratio of the text or the icon included in the augmented reality object moved to the first peripheral zone.

13. The information processing method according to claim 12, further comprising a display position movement step of moving a display position of the augmented reality object within the field of view display range on the display processing device upon determining that the user is walking, wherein the display position movement step includes moving the augmented reality object being displayed in the central zone to the peripheral zone.

* * * * *